(12) United States Patent
Keig

(10) Patent No.: US 11,824,358 B2
(45) Date of Patent: Nov. 21, 2023

(54) TRANSFORMER ECONOMIZER

(71) Applicant: 741 Solutions LLC, Houston, TX (US)

(72) Inventor: James N. Keig, Houston, TX (US)

(73) Assignee: 741 Solutions LLC, Houston, TX (US)

( * ) Notice: Subject to any disclaimer, the term of this patent is extended or adjusted under 35 U.S.C. 154(b) by 0 days.

(21) Appl. No.: 18/168,678

(22) Filed: Feb. 14, 2023

(65) Prior Publication Data
US 2023/0318294 A1 Oct. 5, 2023

Related U.S. Application Data

(60) Provisional application No. 63/325,324, filed on Mar. 30, 2022.

(51) Int. Cl.
*H02J 3/00* (2006.01)
(52) U.S. Cl.
CPC .......... *H02J 3/0075* (2020.01); *H02J 3/003* (2020.01); *H02J 2203/10* (2020.01)
(58) Field of Classification Search
None
See application file for complete search history.

(56) References Cited

U.S. PATENT DOCUMENTS

| | | | | |
|---|---|---|---|---|
| 2010/0013632 A1* | 1/2010 | Salewske | ........... | G01R 19/2513 340/540 |
| 2012/0081929 A1* | 4/2012 | Dvorsky | ........... | H02M 3/33507 363/21.12 |
| 2012/0330671 A1* | 12/2012 | Fan | ........... | G06Q 30/02 705/1.1 |
| 2014/0062221 A1* | 3/2014 | Papastergiou | ........ | H01H 71/10 307/126 |
| 2021/0091571 A1* | 3/2021 | Zhang | ........... | H02J 3/38 |

FOREIGN PATENT DOCUMENTS

| | | | |
|---|---|---|---|
| CN | 201490961 | * | 5/2012 |
| CN | 103280839 A | * | 9/2013 |
| DE | 102014118982 A1 | * | 6/2016 |
| JP | 2017093119 A | * | 5/2017 |
| JP | 2018170816 A | * | 11/2018 |

* cited by examiner

*Primary Examiner* — Thomas C Lee
*Assistant Examiner* — Anzuman Sharmin
(74) *Attorney, Agent, or Firm* — Mehrman Law Office; Michael J. Mehrman

(57) ABSTRACT

A transformer economizer automatically disconnects a main electric power transformer from a grid power line during low-load periods, and automatically reconnects the main transformer to the grid power line during high-load periods, to reduce low-power electricity losses incurred by the main transformer. The main transformer is therefore deenergized and a much smaller auxiliary transformer is energized during low-load periods to reduce the low-power electricity losses incurred by the main transformer. The main transformer is then automatically switched back into service during high-load periods, while the auxiliary transformer is switched out of service. This provides long-term energy, cost, and carbon footprint savings by automatically switching the large transformer's loads to a much smaller auxiliary transformer, and therefore proportionally lower losses, during light-load conditions. Transformer inrush currents are ramped and the secondary voltage remains electrically connected at all times to avoid service interruptions and switching disturbances.

16 Claims, 19 Drawing Sheets

TRANSFORMER ECONOMIZER

CROSS-REFERENCE TO RELATED APPLICATION

This application claims priority to U.S. Provisional Patent Application No. 63/325,324 filed Mar. 30, 2022, the contents of which are incorporated by reference

TECHNICAL FIELD

The present invention is directed to electrical power distribution systems and, more particularly, to a transformer economizer that reduces electric power losses by automatically deenergizing large electric power transformers during low-load periods and reenergizing the transformers during high-load periods.

BACKGROUND

This section of this document introduces information about and/or from the art that may provide context for or be related to the subject matter described herein and/or claimed below. It provides background information to facilitate a better understanding of the various aspects of the technology described below. This is a discussion of "related" art. That such art is related in no way implies that it is also "prior" art. The related art may or may not be prior art. The discussion in this section of this document is to be read in this light, and not as admissions of prior art.

A typical alternating current ("AC") electric power distribution transformer experiences losses in the range of 3% to 5%. These power losses result primarily from resistive losses (often referred to as "copper" losses) and magnetic flux losses (often referred to as "core" losses). The transformers' power losses represent a much larger proportion of a facility's power consumption during low-load periods when the large transformer required to serve high-load periods remains energized. While facility operators generally consider these losses to be an acceptable cost of maintaining adequate transformer capacity to serve the high-load periods, low-load transformer losses can become a very significant component of the facility's power consumption. For example, nearly 4 kVA of power can be lost from a 112.5 kVA transformer by keeping the transformer energized even while carrying negligible real loads.

In commercial facilities that are heavily occupied for only half of the day, five days a week, the low-load transformer losses can represent a massive parasitic energy cost borne by the electric grid and by the owners of those transformers. Similar low-load transformer losses are incurred by industrial facilities and other operations where large intermittent electric loads lie dormant much of the time, such as event arenas, electric public transportation facilities, water pumping facilities, electric vehicle charging stations, and the like. Unnecessary electric transformer losses cause a corresponding excess carbon footprint in the generation and distribution of the wasted electrical energy.

Furthermore, in the United States, commercial facility transformers are sized based on the National Electrical Code ("NEC"), which specifies a certain minimum transformer capacity based on the number of receptacles and the total square footage to accommodate the maximum lighting and receptacles loads potentially energized by the transformer. In many cases, LED lighting and other efficiency improvements reduce the actual electrical demand of the facility well below the theoretical maximum load considered by the NEC. After the design engineer adds some spare capacity, the selected transformer can be much higher-rated than the actual load experienced during normal facility operations. For example, it is not uncommon to encounter a large transformer installed at a commercial building carrying less than 20% of its rated capacity even during peak hours of building occupancy. The transformer load then drops to only a few percent, and in some cases close to zero, during off-peak periods. Meanwhile, the large transformer remains energized all the time, resulting in proportionally higher transformer losses.

There is, therefore, a continuing need for improved techniques for routinely energizing and deenergizing large electric power transformers to reduce low-power electricity losses incurred by the transformers.

SUMMARY

The needs described above are met in a transformer economizer that provides long-term energy, cost, and carbon footprint savings by automatically deenergizing large electric power transformers during low-load periods and reenergizing the transformers during high-load periods. Transformer inrush currents are ramped and the secondary voltage remains electrically connected at all times to avoid service interruptions and switching disturbances.

In a representative embodiment, a main transformer and an auxiliary transformer are electrically connected in parallel between the grid power line and the load. A sensor provides an electric current measurement associated with power delivered to the load. A controller receives the electric current measurement and determines a low transition trigger based on the electric current measurement along with control parameters. In response to the low transition trigger, the controller automatically connects the auxiliary transformer and disconnects the main transformer from the power circuit. The controller also determines a high transition trigger and automatically connects the main transformer and disconnects the auxiliary in response to the high transition trigger.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

The above presents a simplified summary in order to provide a basic understanding of some aspects of the invention. This summary is not an exhaustive overview of the invention. It is not intended to identify key or critical elements of the disclosure or to delineate the scope of the invention. Its sole purpose is to present some concepts in a simplified form as a prelude to the following more detailed description, appended drawings, and claims.

BRIEF DESCRIPTION OF THE FIGURES

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
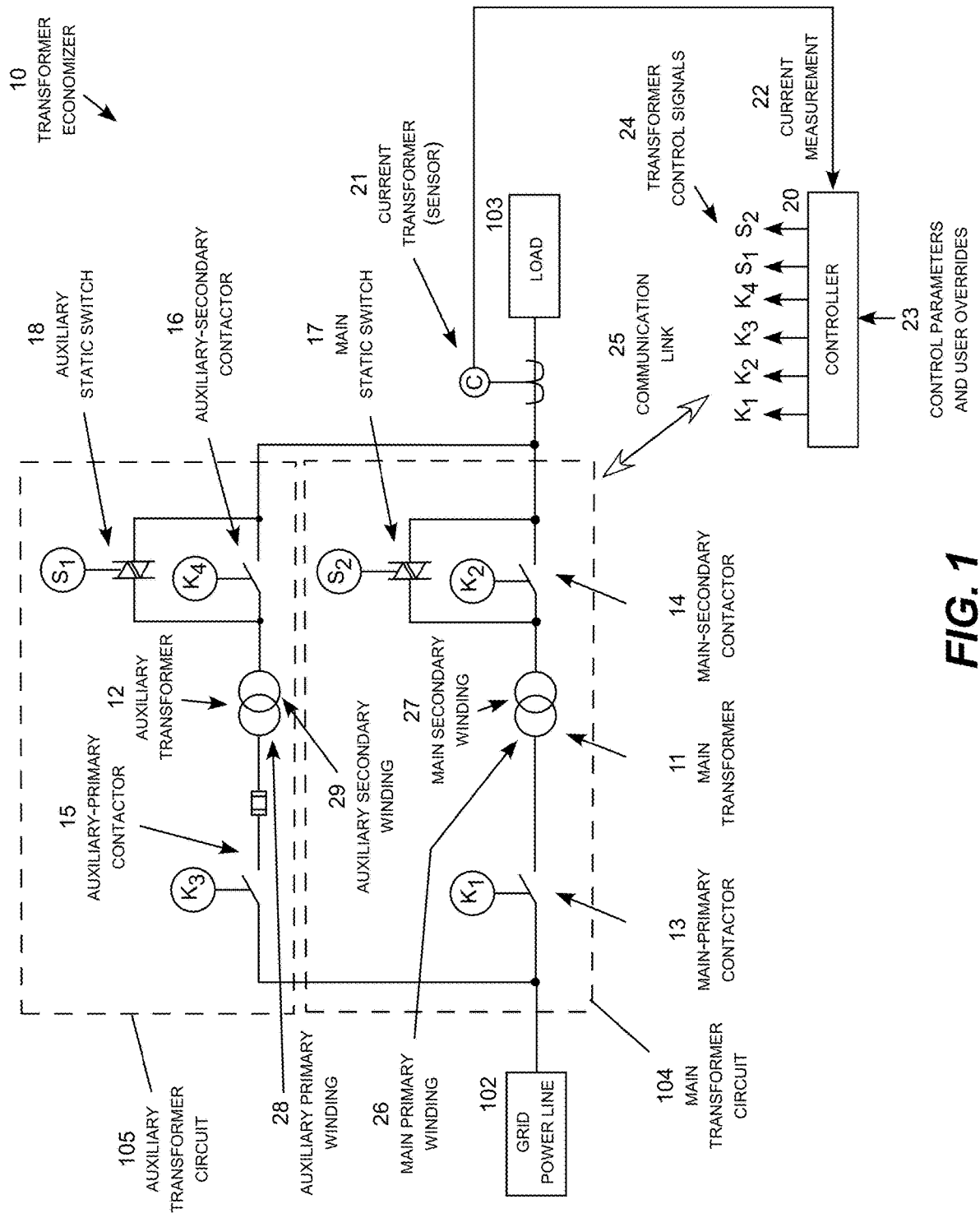
FIG. 1 is a one-line electric diagram of a transformer economizer including a main transformer and an auxiliary transformer.

While the invention is susceptible to various modifications and alternative forms, the drawings illustrate representative embodiments of the invention by way of example. It should be understood, however, that the description of specific examples is not intended to limit the invention to the particular forms disclosed, but on the contrary, the intention covers all modifications, equivalents, and alternatives falling within the spirit and scope of the invention as defined by the appended claims.

DESCRIPTION OF ILLUSTRATIVE EMBODIMENTS

Embodiments of the present invention include a transformer economizer that automatically disconnects a main electric power transformer from a grid power line during low-load periods, and automatically reconnects the main transformer to the grid power line during high-load periods, to reduce low-power electricity losses incurred by the main transformer. In a representative embodiment, the main transformer is deenergized and a much smaller auxiliary transformer is energized during low-load periods to reduce the low-power electricity losses incurred by the main transformer. The main transformer is then automatically switched back into service during high-load periods, while the auxiliary transformer is switched out of service. The embodiments provide long-term energy, cost, and carbon footprint savings by automatically switching the large transformer's loads to a much smaller auxiliary transformer, and therefore proportionally lower losses, during light-load conditions. In so doing, the secondary voltage remains electrically connected at all times to avoid service interruptions or switching disturbances with much less wasted electrical energy.

In the illustrated embodiments, the control parameters may include a programmable low-power threshold and a programmable low-power dwell time. The controller determines the low transition trigger by determining that the power delivered to the load has been equal to or below the low-power threshold for a period of time equal to or greater than the low-power dwell time. Similarly, the control parameters may include a programmable high-power threshold and a programmable high-power dwell time. The controller determines the high transition trigger by determining that the power delivered to the load has been equal to or above the high-power threshold for a period of time equal to or greater than the high-power dwell time.

In another embodiment, the control parameters include load scheduling parameters, and the controller may determine the high transition trigger by determining the load is scheduled to be above the rated auxiliary power capacity based on the load scheduling parameters. For example, the load scheduling parameters may include an industrial shift schedule, and industrial equipment schedule, an arena event schedule, an electric public transportation schedule, a water pumping schedule, or an electric vehicle charging station schedule. Similarly, the control parameters may include load predicting parameters, and the controller may determine the high transition trigger by determining the load is predicted to be above the rated auxiliary power capacity based on the load predicting parameters. For example, the load predicting parameters may include the time-of-day, day-of-week, annual or event season, holiday, travel forecast, weather forecast, or solar index prediction. As another example, the low and high transition triggers may be based, at least in part, on one or more load-side power generation parameters.

According to an aspect of a representative embodiment, a main transformer circuit includes a main-primary contactor coupled to the grid power line and a primary winding of a main transformer, a main-secondary contactor coupled to a secondary winding of the main transformer, and a first static switch electrically connected in parallel with the main-secondary contactor. In addition, an auxiliary transformer circuit includes an auxiliary-primary contactor coupled to the grid power line and a primary winding of an auxiliary transformer, an auxiliary-secondary contactor coupled to a secondary winding of the auxiliary transformer and the load, and a static switch electrically connected in parallel with the auxiliary-secondary contactor.

In this example, the controller connects the auxiliary transformer to the grid power line by switching the first static switch to ramp a magnetizing current energizing a magnetic core of the auxiliary transformer through the secondary winding of the auxiliary transformer in a controlled manner. After energizing the magnetic core of the auxiliary transformer, the controller closes the auxiliary-secondary contactor. After closing the auxiliary-secondary contactor, the controller closes the auxiliary-primary contactor momentarily connecting the auxiliary transformer and the main transformer in parallel between the grid power line and the load. After closing the auxiliary-primary contactor, the controller disconnects the main transformer from the grid power line and the load by opening the main-primary and main-secondary contactors.

Similarly, the controller connects the main transformer to the grid power line by switching the second static switch to ramp a magnetizing current energizing a magnetic core of the main transformer through the secondary winding of the main transformer in a controlled manner. After energizing the magnetic core of the main transformer, the controller closes the main-secondary contactor. After closing the main-secondary contactor, the controller closes the main-primary contactor momentarily connecting the main transformer and the auxiliary transformer in parallel between the grid power line and the load. After closing the main-primary contactor, the controller disconnects the auxiliary transformer from the grid power line and the load by opening the auxiliary-primary and auxiliary-secondary contactors.

The functionality of the transformer economizer is not dependent on the cause of the load variation or the number of available service transformers. For example, in a commercial building, the transmission economizer may automatically switch the power supply between a main transformer a single auxiliary transformer to follow the daily load requirement caused by building occupancy. In an industrial facility, the transformer economizer may automatically switch among multiple service transformers to follow changes in the industrial shifts and electric equipment utilization. The transformer economizer can similarly switch among multiple service transformers to match fluctuating loads at event arenas, electric public transportation facilities, water pumping facilities, electric vehicle charging stations, and the like. Regardless of the cause of the load variation or the number of available service transformers, the transformer economizer may switch among the available transformers to match the connected transformer capacity with recurring load levels, such as daily variations, weekly variations, seasonal variations, industrial load variations, electric transportation utilization, electric vehicle charging requirements, and so forth.

In addition, the transformer economizer can be used to match the connected transformer capacity with distributed power generation levels to reduce low-power losses in distributed generation, bi-directional power flow, and micro-grid systems. Embodiments of the invention may therefore be utilized to match the power ratings of the connected service transformers with changes in power levels, regardless of whether the changes in power levels are cause by changes in the power loads or generation.

The transformer economizer includes a controller that utilizes a load current measurement and control parameters to determine when to switch among the available service transformers. In a representative embodiment, the controller utilizes programmable parameters, such as a low-power threshold ("LPT") and a low transition dwell time to determine a low transition trigger. The controller then automatically switches the power supply from the main transformer (normal operation mode) to the auxiliary transformer (auxiliary power mode). Similarly, the controller may utilize a high-power threshold ("HPT") and a high transition dwell time to determine a high transition trigger. The controller then automatically switches the power supply from the auxiliary transformer to the main transformer (normal operation mode). When switching between transformers, the controller momentarily connects both transformers in parallel (parallel feed mode) to avoid service interruptions or switching disturbances when changing the power supply. In this context, "momentarily" refers to "make before break" connection ensuring that the newly connected transformer is connected before disconnecting the previously connected transformer.

While switching to the lower capacity auxiliary transformer based on a measured drop in the load power, it may be advantageous to switch to the larger capacity main transformer before encountering a large increase in load to prevent the overcurrent breaker from tripping. This may be thought of as dispatching the appropriately sized transformer in anticipation of expected loads, similar to dispatching of generation resources in anticipation of expected loads. In a system with significant distributed generation resources, adequate transformer capacity may therefore be dispatched in conjunction with dispatching generation resources. Accordingly, the transformer economizer controller may utilize use other types of control parameters to determine the high transition trigger. For example, the controller may utilize load scheduling parameters, such as industrial shift schedules, industrial equipment schedules, arena event schedules, electric transportation schedules, water pumping schedules, electric vehicle charging station schedules, interruptable load schedules, power exchange schedules, and other scheduled and utility demand events driving load levels served by the transformers controlled by the transformer economizer.

The controller may alternatively or additionally use prediction parameters, such as time-of-day, day-of-week, annual or event season, holidays, travel forecasts, weather forecasts, water usage predictions, water tank level monitoring, solar index predictions, and other events that can be reliably used to predict load levels to determine the high transformer transition trigger prior to experiencing the higher load level. In other embodiments involving distributed generation resources on the secondary (low voltage) side of the transformers, such as micro-grid power systems, the controller may alternatively or additionally use power generation parameters, such as power generation schedules, power generation predictions, electric utility power interchange schedules, market pricing signals, and other parameters events that can be reliably used to predict electric power generation levels to determine the high and low transformer transition triggers. An authorized user may also override the control algorithm to manually select one or more desired service transformers as deemed necessary.

Referring to an illustrative embodiment with a main transformer and an auxiliary transformer, the auxiliary transformer back-feeds the secondary winding of the main transformer to magnetize the main transformer core in a controlled manner prior to connecting the main transformer to the grid power line. An electronic static switch ramps the magnetizing current in a controlled manner to mitigate the main transformer inrush current. Although less important due to the smaller power rating of the auxiliary transformer, the main transformer back-feeds the secondary winding of the auxiliary transformer to magnetize the auxiliary transformer core prior to connecting the auxiliary transformer to the grid power line. Again, an electronic static switch ramps the magnetizing current to charge the auxiliary transformer magnetic core in a controlled manner prior to connecting the auxiliary transformer to the grid power line.

During both the "transition low" to auxiliary transformer service and the "transition high" to main transformer service, both transformers are momentarily connected in parallel to avoid power supply disruptions or disturbances while continuously supplying power to the secondary (load) side of the transformers. The same technique is used to match the connected transformer size to distributed generation levels, which accommodates bi-directional power flow and injection of distributed generation into the power grid through the transformer economizer.

For example, a bi-directional transformer economizer utilizes an auxiliary transformer and main transformer to reduce low-power transformer losses in an electric power system in which the electric power can flow in either direction between an electric grid power line connected to the primary side of the transformers and a distributed generator connected to the secondary side of the transformers. The transformer economizer utilizes an auxiliary transformer or a distributed generator to charge the magnetic core of a main transformer prior to connecting the transformer to the grid power line allowing the main transformer to be automatically disconnected from the grid power line during low-load period.

In another example, a multi-stage transformer economizer utilizes multiple auxiliary transformers and main transformer to match the connected transformer to different recurring load conditions. Another example utilizes a dedicated battery-inverter power supply to charge the magnetic core of the main transformer prior to connecting the transformer to the grid power line allowing the main transformer to be automatically disconnected from the grid power line during low-load period. Another alternative embodiment includes a stand-by auxiliary power transformer economizer utilizes a stand-by generator to charge the magnetic core of a main transformer prior to connecting the transformer to the grid power line allowing the main transformer to be automatically disconnected from the grid power line during low-load period. In addition, a micro-grid transformer economizer selects between a main transformer and an auxiliary transformer to match the transformer size to match the electric power generated in an electric power micro-grid.

FIG. 1 is a one-line electric diagram of a transformer economizer 10 including a grid power line 102 providing electric power to a load 103 through a main transformer circuit 104 and an auxiliary transformer circuit 105. Note that, in the illustrated embodiments, the load 103 and the grid line 102 are not a part of either the main transformer circuit 104 or the auxiliary transformer circuit 105 and, thus, not a part of the transformer economizer 10. The transformer economizer 10 includes a controller 20 and a current transformer (commonly referred to as a "CT") 21 sensing current to the load 103 and providing a current measurement 22. The controller 20 uses the current measurement 22 to determine the level of the load 103 and then automatically switch the power supply between the main transformer circuit 104 and the auxiliary transformer circuit 105 to reduce low-power transformer losses. Note also that, as used herein, the term "automatically" means without human involvement—e.g., under programmed control.

The controller 20 receives programmable inputs 23 to automatically determine when to issue transformer control signals 24, which may be delivered to transformer switches via a wired or wireless communication link 25 to control the operation of the main and auxiliary transformer circuits 104, 105. For example, the control parameters 23 may include a low-power threshold ("LPT"), a low transition dwell time ("LPT Dwell"), a high-power threshold ("HPT"), a high transition dwell time ("HPT Dwell"). The programmable inputs 23 are, in this embodiment, user-programmable.

The controller 20 automatically switches the transformers to "transition low" to auxiliary transformer service ("auxiliary power mode") when the measured load has been below the low-power threshold for longer than the low transition dwell time. Similarly, the controller 20 automatically switches the transformers to "transition high" to main transformer service ("normal operation mode") when the measured load has been above the high-power threshold for longer than the high transition dwell time. In a system with multiple auxiliary transformers, each transformer has its respective power thresholds and dwell times. Other types of control parameters may be used to automatically determine the low and high transition triggers, such as load scheduling parameters, load prediction parameters, and load-side distributed power generation parameters. An authorized user may also override the control algorithm to manually select one or more desired service transformers as deemed desirable or necessary.

The main and auxiliary transformer circuits 104, 105 are configured to minimize transformer inrush currents and transient voltage disturbances when switching between the transformers. The main transformer circuit 104 includes a main transformer 11 and a main-primary contactor 13 for connecting the primary winding 26 of the main transformer to the grid power line 102. The main-primary contactor 13 may be any suitable type of remotely controlled primary (high voltage) switch, such as a radio-controlled circuit breaker, motor-operated blade switch, vacuum or gas circuit interrupter, or other suitable type of remotely controlled primary voltage switch. Since the core of the main transformer 11 will already be synchronized with the energized grid power line when the main-primary contactor 13 is closed, additional specialized high voltage equipment, such as three phase pre-insertion resistors, is not required to avoid excessive transformer inrush currents and transient voltage disturbances conventionally associated with initially connecting a large electric power transformer to an energized power line.

The main transformer circuit 104 also includes a main-secondary contactor 14 for connecting the secondary winding 27 of the main transformer to the load 103. Since the core of the main transformer 11 will not be synchronized with the energized grid power line when the main-secondary contactor 14 is closed, a static switch is used to ramp the current delivered to the secondary winding 27 of the main transformer 11 in a controlled manner to avoid excessive transformer inrush currents and associated transient voltage disturbances conventionally associated with initially connecting a large electric power transformer to an energized power line.

The main static switch 17 may be a secondary (low voltage) electronic device that ramps high currents at a controlled rate to mitigate the potentially high transformer inrush current incurred to charge the main transformer magnetic core. Since the main static switch 17 is operated at the secondary (low) voltage, electronic devices are available at much lower cost than primary (high voltage) alternatives, such as circuit interrupters with mechanically operated pre-insertion resistors. For example, the main static switch 17 may be a high-power electronic thyristor that works like an electronically controlled variable resistor (commonly referred to as a "varistor"). High power electronic thyristors are generally available at reasonable costs for many secondary voltage and current requirements.

Initially connecting a large electric power transformer to a grid power line is problematic due to large transformer inrush currents, and resulting transient voltage disturbances, when initially magnetizing the transformer cores (also referred to as "energizing" or "charging" the transformer). An electric transformer operates through magnetic flux carried by a transformer core coupling the electric currents flowing in the primary (high voltage) and secondary (low voltage) windings. When a deenergized transformer is initially coupled to an electric power source, the transformer initially appears as a short circuit for the first few electric power cycles until the core magnetization becomes synchronized with the system power cycle. This produces a large transformer inrush current, typically in the range of 2 to 10 times the rated transformer current, for several electric power cycles.

Unless mitigated, the transformer inrush current causes a "transient voltage disturbance" characterized by sharp voltage sags with high harmonic content. The transient voltage disturbance is experienced by other equipment connected to the electric power circuit potentially damaging or causing electronic equipment to drop offline, which may include important electronic equipment including power supplies connecting distributed generators to the electric power grid. In severe cases, the high inrush currents can cause protective feeder breakers or reclosers to trip causing a wider power disturbance effecting a much larger number of devices. Many regulators and electric power utilities therefore enforce regulations limiting transient voltage disturbances, for example to 3% to 5% of the rated line voltage.

The higher the power rating of the transformer, the larger the magnetic core and potential inrush current. Large transformers may therefore employ inrush current mitigation if they are to be routinely disconnected and reconnected to the power grid. Most conventional transformer inrush current mitigation devices utilize pre-insertion resistors mechanically inserted in series with the transformer during the first few cycles of initial connection to the power grid to limit the inrush current. Electric utilities have traditionally installed these devices on the primary (high voltage) side of the transformer where currents are correspondingly lower. This type of high voltage equipment is expensive, however, typically requiring a three phase gas circuit interrupter with pre-insertion resistors and a ground footprint in addition to the existing high voltage breaker or disconnect switch. In many cases, electric utilities may find this type of equipment economically infeasible and choose instead to leave large electric transformers energized at all times except during emergency and scheduled maintenance outages.

Electric power engineers will appreciate that currents experienced on the secondary (low voltage) side of a transformer are higher than the currents experienced on the primary (high voltage) side by the transformer winding turns ratio, which also inversely drives the voltage ratio. In other words, a transformer winding turns ratio of 20:1 will cause secondary currents to be about 20 times higher than primary currents, while correspondingly causing the primary voltage to be about 20 times higher than the secondary voltage. For this example, an unrestrained transformer inrush current supplied through the transformer's secondary winding will be about 20 times higher than a corresponding unrestrained transformer inrush current supplied through the transformer's secondary winding. It is therefore important, when charging a large transformer though the secondary winding, to adequately ramp the inrush current. In this context, "adequately ramping the inrush current" refers to ramping the transformer inrush current sufficiently to prevent tripping any overcurrent protection devices, such as a circuit breakers or fuse. This effectively drives the performance requirement of the main static switch 17 ramping the main transformer inrush current supplied to the secondary winding of the main transformer.

The main static switch 17 may additionally or alternatively utilize other techniques to limit the inrush current, such as point-on-wave switching. In an AC power system, the voltage, current and transformer magnetic flux all vary on a cyclical basis (60 Hertz in the United States, 50 Hertz in Europe) with two zero-crossing and two peaks each electric power cycle. When a transformer is disconnected from its AC power supply, the magnetization of the core does not instantaneously drop to zero, but instead remains at the magnetization state of the moment of power disconnection (commonly referred to as the "residual flux"), which can be any point along the cyclical magnetization curve. As a result, the transformer core is in a residual flux state when the power is reconnected. The transformer inrush current can therefore be minimized, or at least mitigated, by precisely timing the switch closing to match the power source with the residual flux state of the transformer core. While it may be theoretically possible to zero-out the transformer inrush current using this technique, mechanical switch linkage latency, relay latency, and reactive power effects increase the challenge at the millisecond scale for AC power switch timing. While voltage measurements and additional position sensors may be used to by the point-on-wave controller, this is otherwise a software feature implemented within the controller without requiring additional high voltage or high current hardware.

While the precision of the switch timing is limited by these practical considerations, point-of-wave switch controllers effectively utilize this technique to partially mitigate transformer inrush currents, which reduces the high-current requirements and stress imposed on of the thyristors. Electronic static switch may additionally or alternatively utilize other circuit elements, such as resistive elements, reactive elements, varistors, electronic switches, and the like to assist in adequately ramping the transformer magnetizing currents. Electronic static switches utilizing these techniques installed on the secondary (low voltage) side of the transformer are physically smaller and easier to install, and in many cases may be significantly less expensive than gas circuit interrupters with mechanically operated pre-insertion resistors conventionally installed on the primary (high voltage) side of the transformer. As a result, the innovative transformer economizer can be economically installed on a wider range of distribution transformers resulting in significant, long-term savings in electricity losses, cost, and carbon footprint.

Although the power requirement of the auxiliary transformer is smaller than the main transformer, resulting in correspondingly smaller core loss and inrush current concerns, the auxiliary transformer circuit 105 utilizes the same transformer switching circuitry as the main transformer circuit 104. This is because it significantly reduces switch arcing and stresses significantly increasing the expected life of the associated contactor. Specifically, the auxiliary transformer circuit 105 includes an auxiliary transformer 12 and an auxiliary-primary contactor 15 for connecting the primary winding 28 of the auxiliary transformer to the grid power line 102. The auxiliary-primary contactor 15 may be any suitable type of remotely controlled primary (high voltage) switch, such as a radio-controlled circuit breaker, motor-operated blade switch, vacuum or gas circuit interrupter, or other suitable type of remotely controlled primary voltage switch. Since the core of the auxiliary transformer 12 will already be synchronized with the energized grid power line when the auxiliary-primary contactor 15 is closed, additional specialized primary (high voltage) equipment, such as three phase pre-insertion resistors, is not required to avoid excessive transformer inrush currents and associated transient voltage disturbances, switch arcing, and potential flashover at the auxiliary-primary contactor 15.

The auxiliary transformer circuit 105 also includes an auxiliary-secondary contactor 16 for connecting the secondary winding 29 of the auxiliary transformer to the load 103. Since the core of the auxiliary transformer 12 would otherwise be demagnetized when the auxiliary-secondary contactor 16 is closed, an auxiliary static switch 18 is used to ramp the current delivered to the secondary winding 29 of the auxiliary transformer 12 in a controlled manner prior to closing the auxiliary-secondary contactor 16. Ramping the magnetizing current through the auxiliary static switch 18 prior to closing the auxiliary-secondary contactor 16 avoids excessive transformer inrush currents and associated transient voltage disturbances, switch arcing, and potential flashover associated with initially magnetizing the auxiliary transformer core.

The auxiliary-secondary contactor 16 may be any suitable type of remotely controlled secondary (low voltage) switch, such as a radio-controlled circuit breaker, motor-operated blade switch, or other suitable remotely controlled secondary voltage contactor. Since the core of the auxiliary transformer 12 will already be synchronized with the energized grid power line when the auxiliary-secondary contactor 16 is closed, additional specialized secondary voltage equipment, such as three phase pre-insertion resistors, is not required to avoid excessive transformer inrush currents and associated transient voltage disturbances, switch arcing, and potential flashover at the auxiliary-secondary contactor 16. Again, the auxiliary static switch 18 may be a secondary (low voltage) electronic device that ramps high currents at a controlled rate to mitigate the potentially high transformer inrush current incurred to charge the main transformer magnetic core.

Figure 2A:
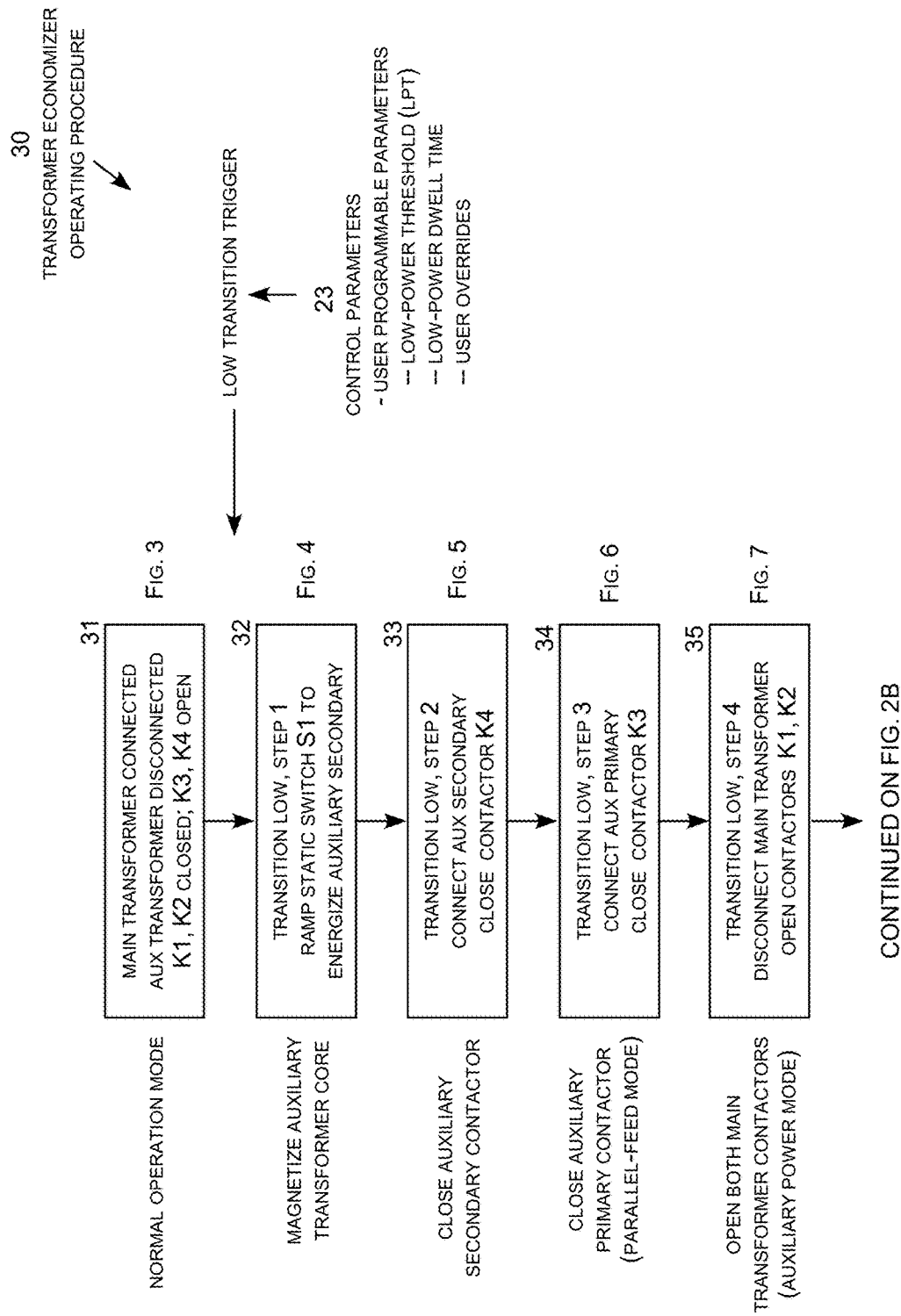
FIGS. 2A and 2B are a logic flow diagram illustrating an operating procedure for the transformer economizer.
Figure 2B:
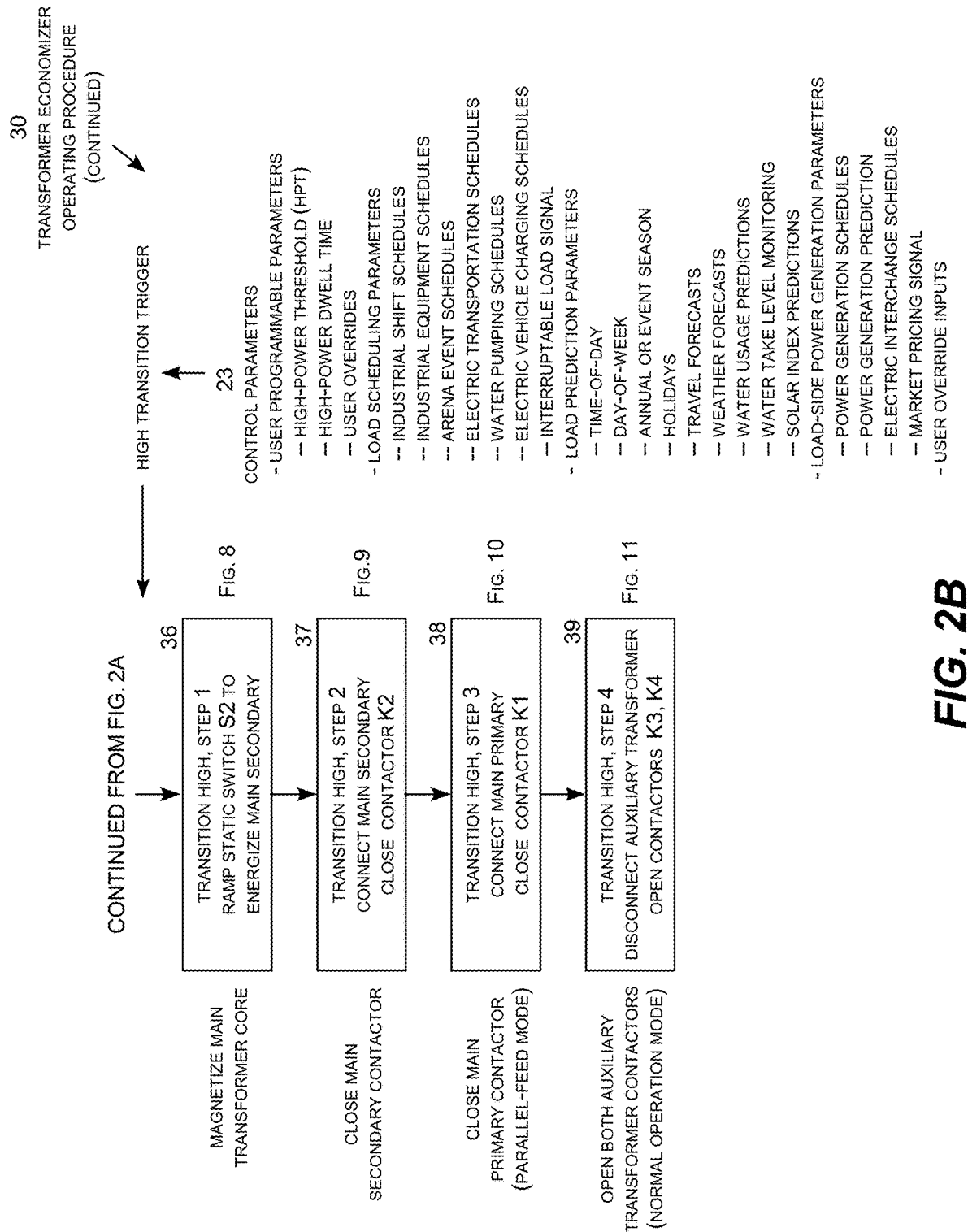

FIGS. 2A and 2B are a logic flow diagram 30 illustrating an operating procedure for the transformer economizer 10. FIGS. 3-11 are one-line circuit diagrams illustrating the switching states described in the logic flow diagram 30, where current flows are indicated by bold lines. Switch actuators and their respective control signals are indicated by the identifiers K1, K2, K3, K4, S1 and S2 as indicated on the controller 20 and the various switch actuators in the one-line circuit diagrams. A switch actuator and its associated control signal K1 corresponds to the main-primary contactor 13, a switch actuator and its associated control signal K2 corresponds to the main-secondary contactor 14, a switch actuator and its associated control signal K3 corresponds to the auxiliary-primary contactor 15, a switch actuator and its associated control signal K4 corresponds to the auxiliary-secondary contactor 16, a switch actuator and its associated control signal S1 corresponds to the main static switch 17, and a switch actuator and its associated control signal S2 corresponds to the auxiliary static switch 18. Closing or opening a switch actuator in the following description corresponds to closing or opening the associated switch and, in the case of S1 and S2 actuating the static switches 17 and 18, ramping the inrush current inn the associate switch in a controlled manner to mitigate the transformer inrush current.

Figure 3:
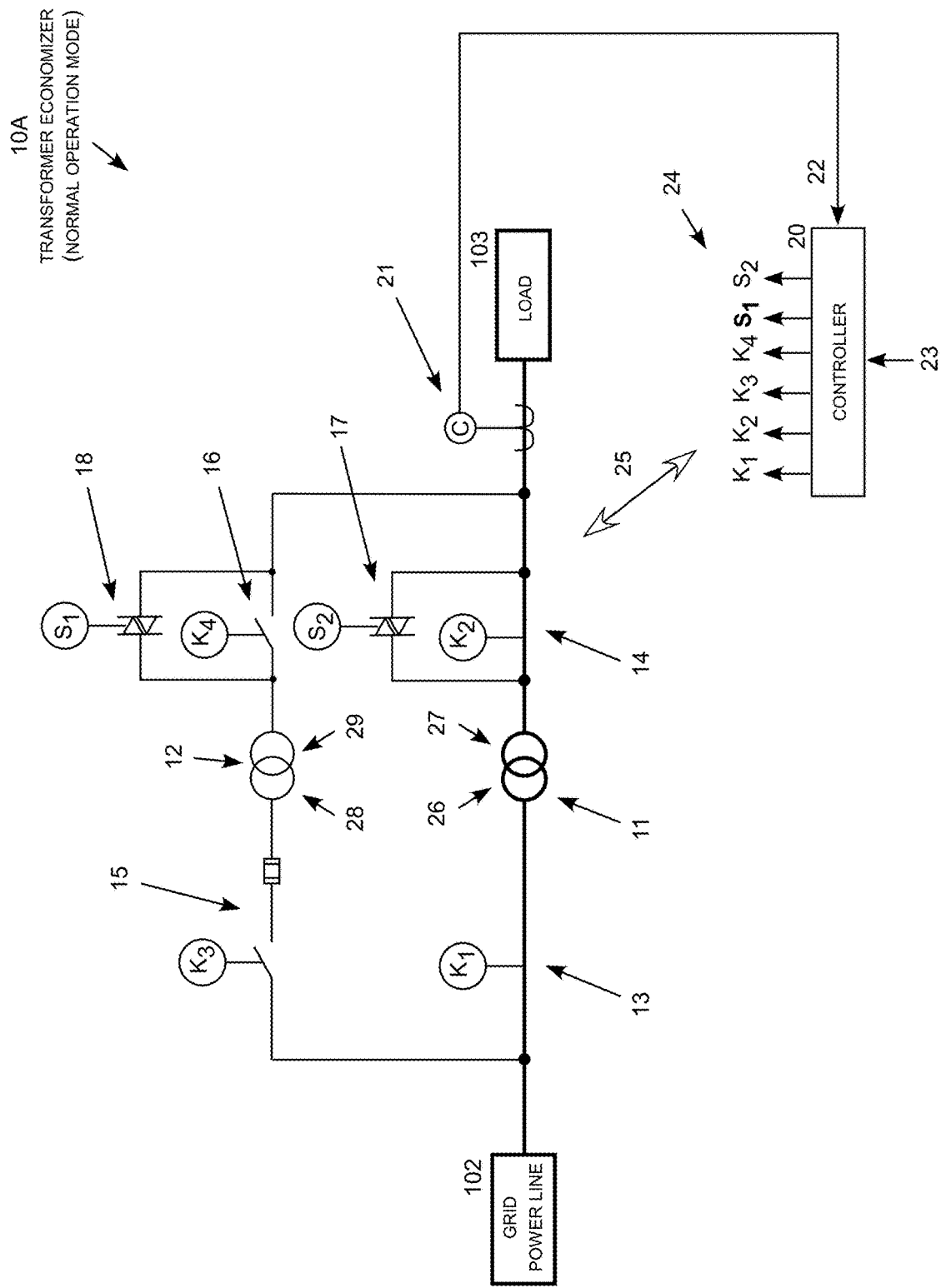
FIG. 3 is a one-line electric diagram illustrating the transformer economizer in a normal operating mode.

Step 31 illustrates the "normal operating mode" shown in the FIG. 3 one-line circuit diagram, in which K1 (controlling the main-primary contactor 13) and K2 (controlling the main-secondary contactor 14) are closed, while K3 (controlling the auxiliary-primary contactor 15) and K4 (controlling the auxiliary-secondary contactor 16) are open. As a result, the main transformer 11 connects the grid power line 102 to the load 103, while the auxiliary transformer 12 is fully disconnected from the circuit.

Figure 4:
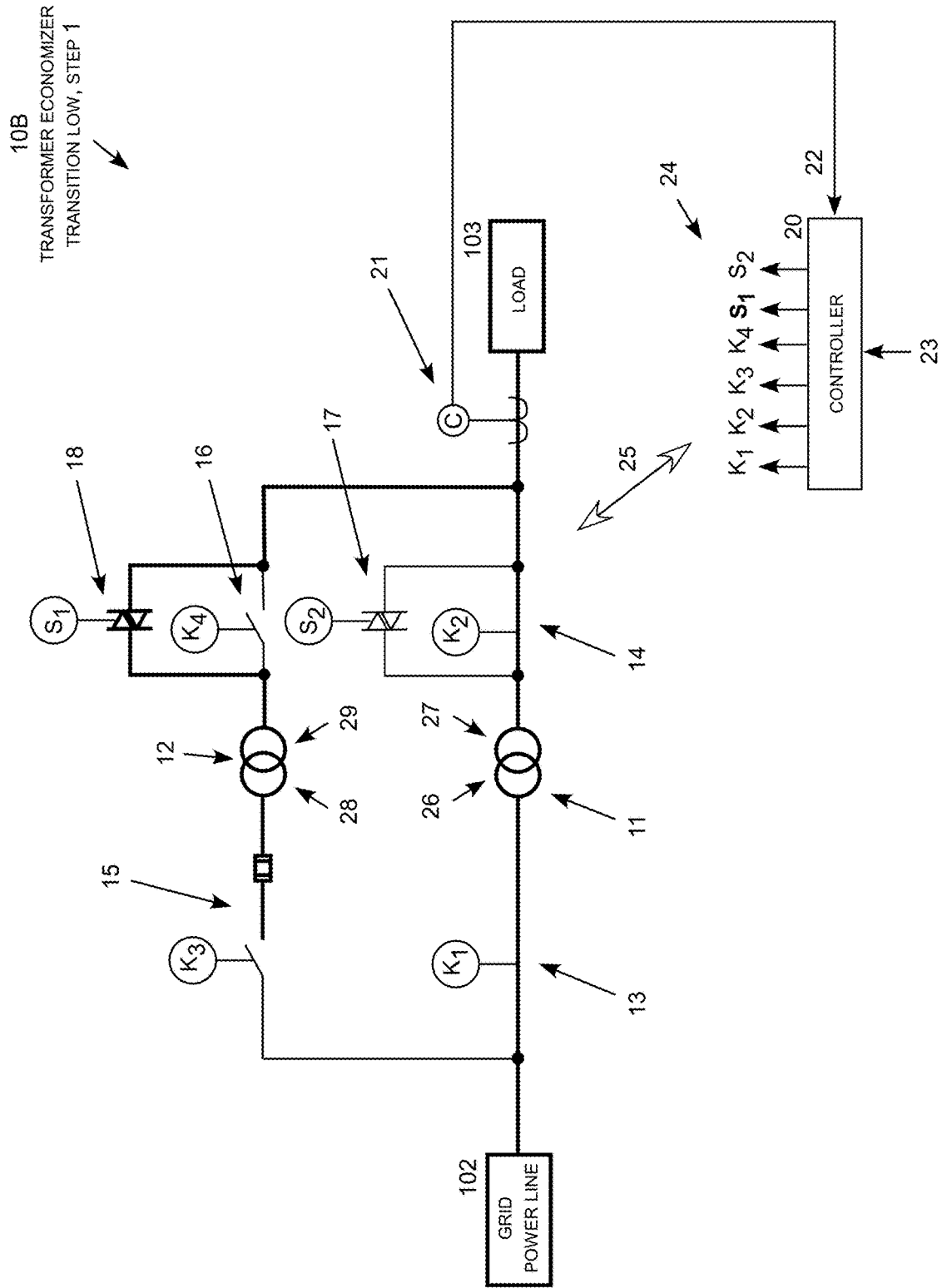
FIG. 4 is a one-line electric diagram illustrating the transformer economizer during a first step of a low transition.

Following step 31, the controller 20 detects a low transfer trigger, in this example when the power delivered to the load 103 has dropped below a preset low-power threshold (LPF) for a duration longer than the low-power dwell time. The low-power threshold and the low-power dwell time are programmable parameters entered into the controller 20, which uses these parameters and the current measurement 22 to determine when to initiate the low transition to switch the power supply to the auxiliary transformer. To initiate the low-power transition, step 31 is followed by step 32 (transition low, step 1), in which the controller activates the static switch S1 to ramp the power to charge the core of the auxiliary transformer 12 by back-feeding the secondary winding 29 of the auxiliary transformer, as shown in FIG. 4.

Figure 5:
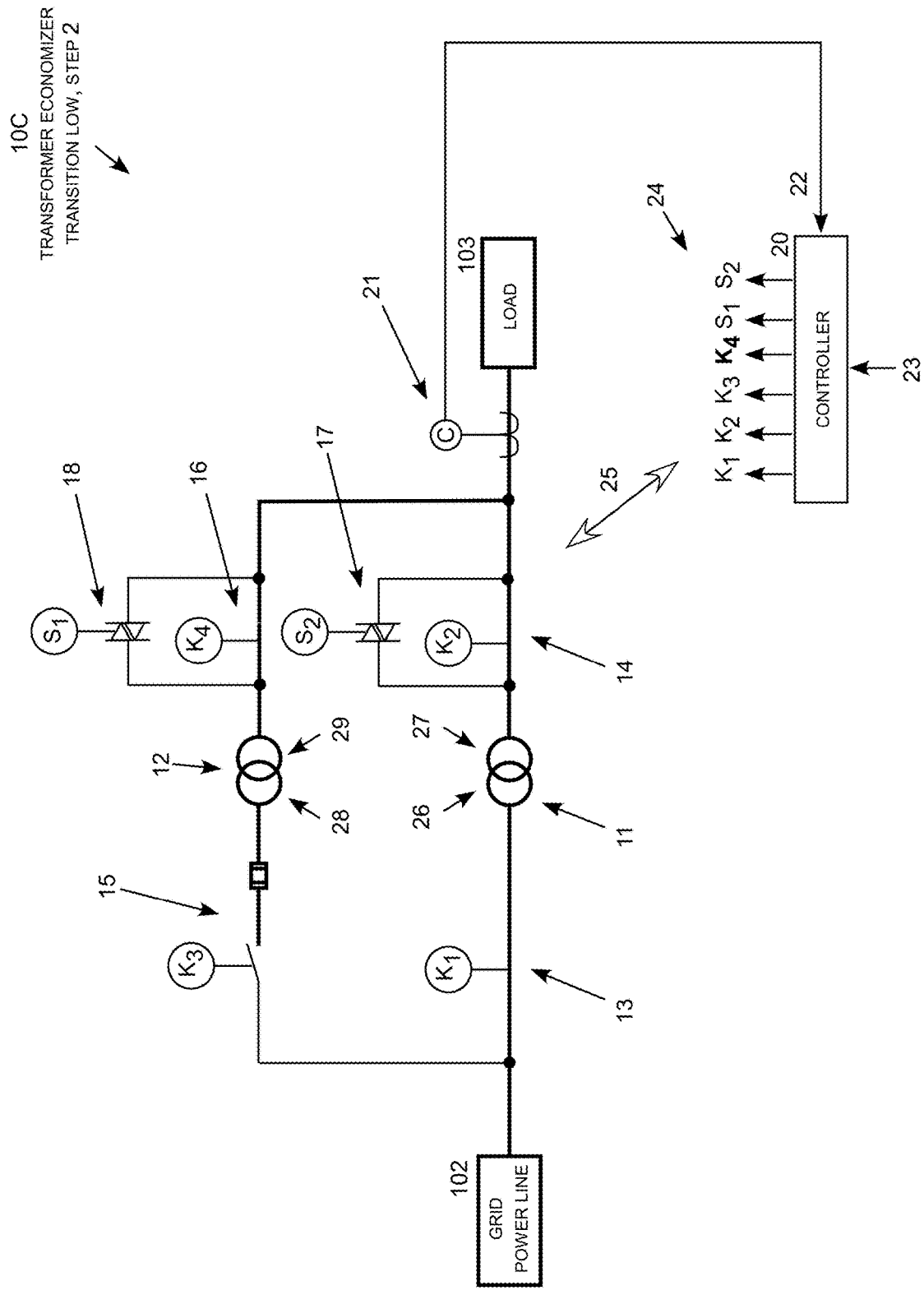
FIG. 5 is a one-line electric diagram illustrating the transformer economizer during a second step of the low transition.
Figure 6:
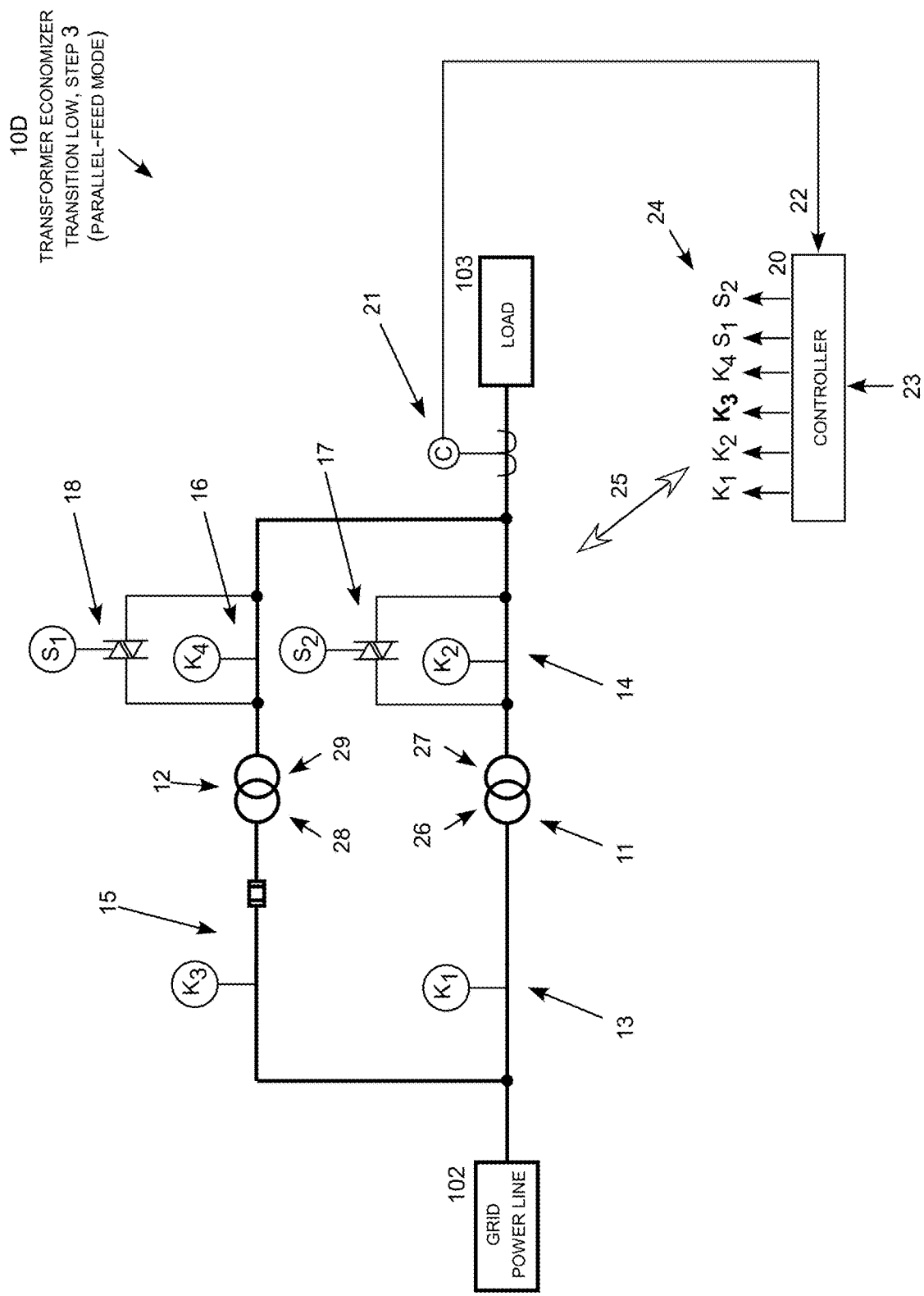
FIG. 6 is a one-line electric diagram illustrating the transformer economizer during a third step of the low transition.
Figure 7:
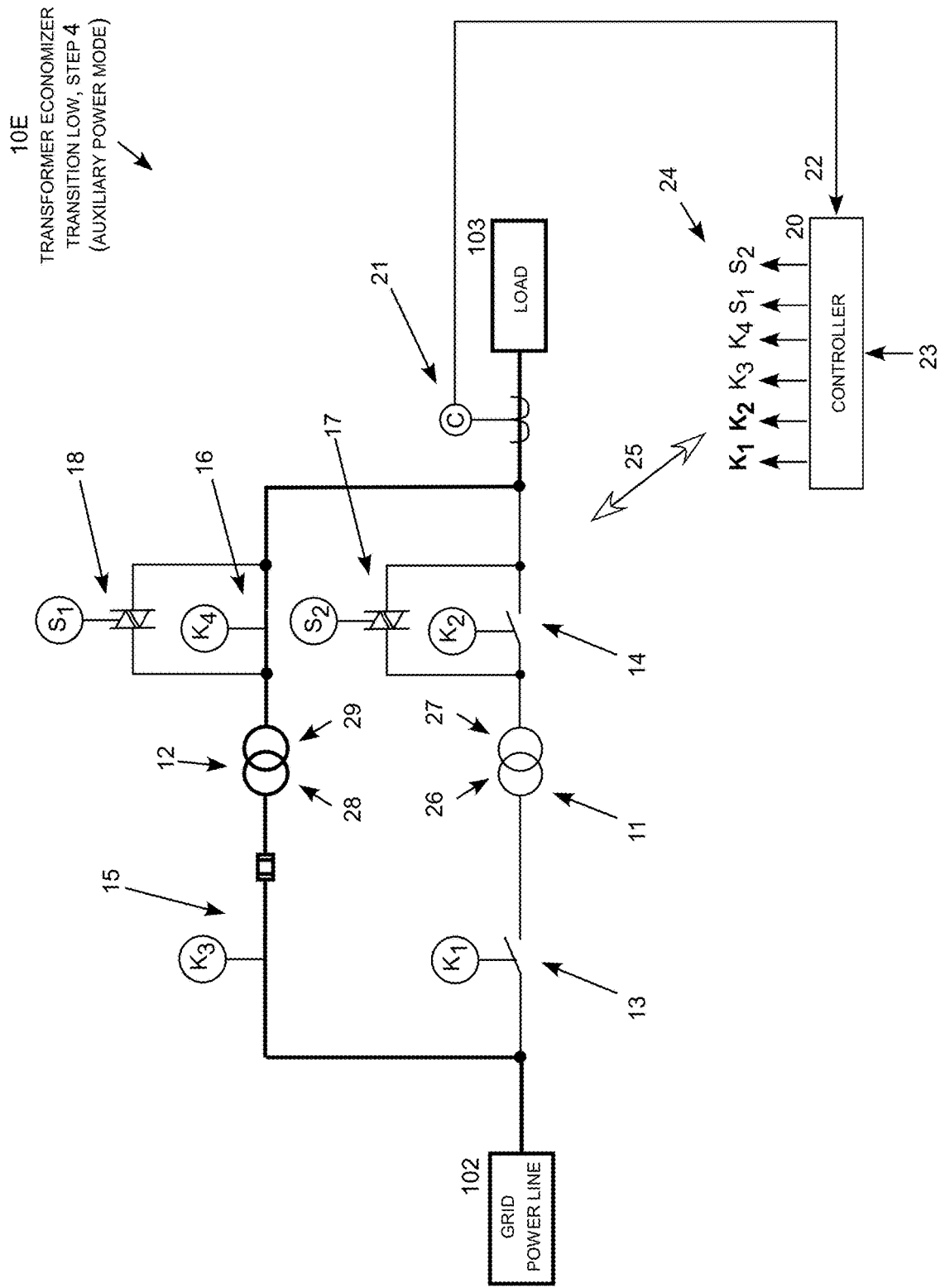
FIG. 7 is a one-line electric diagram illustrating the transformer economizer during a fourth step of the low transition.

Once the core of the auxiliary transformer 12 is synchronized with the energized grid power line, step 32 is followed by step 33 (transition low, step 2), in which the controller activates the actuator K4 to close the auxiliary-secondary contactor 16, as shown in FIG. 5. After the auxiliary-secondary contactor 16 is closed, step 33 is followed by step 34 (transition low, step 3) in which the controller activates the actuator K3 to close the auxiliary-primary contactor 15, as shown in FIG. 6. At this point, the main transformer 11 and the auxiliary transformer 12 connect the grid power line 102 to the load 103 in parallel (parallel feed mode), which allows the main transformer to be disconnected without imposing any significant transient voltage or other switching disturbance on the grid power line 102 or the load 103. Step 34 is followed by step 35 (transition low, step 4) in which the controller activates actuators K1 to open the main-primary contactor 13 and K2 to open the main-secondary contactor 14, which disconnects the main transformer 11 from the power supply. At this point, the auxiliary transformer 12 is fully connected, while the main transformer 11 is fully disconnected, between the grid power line 102 and the load 103 (auxiliary power mode).

Figure 8:
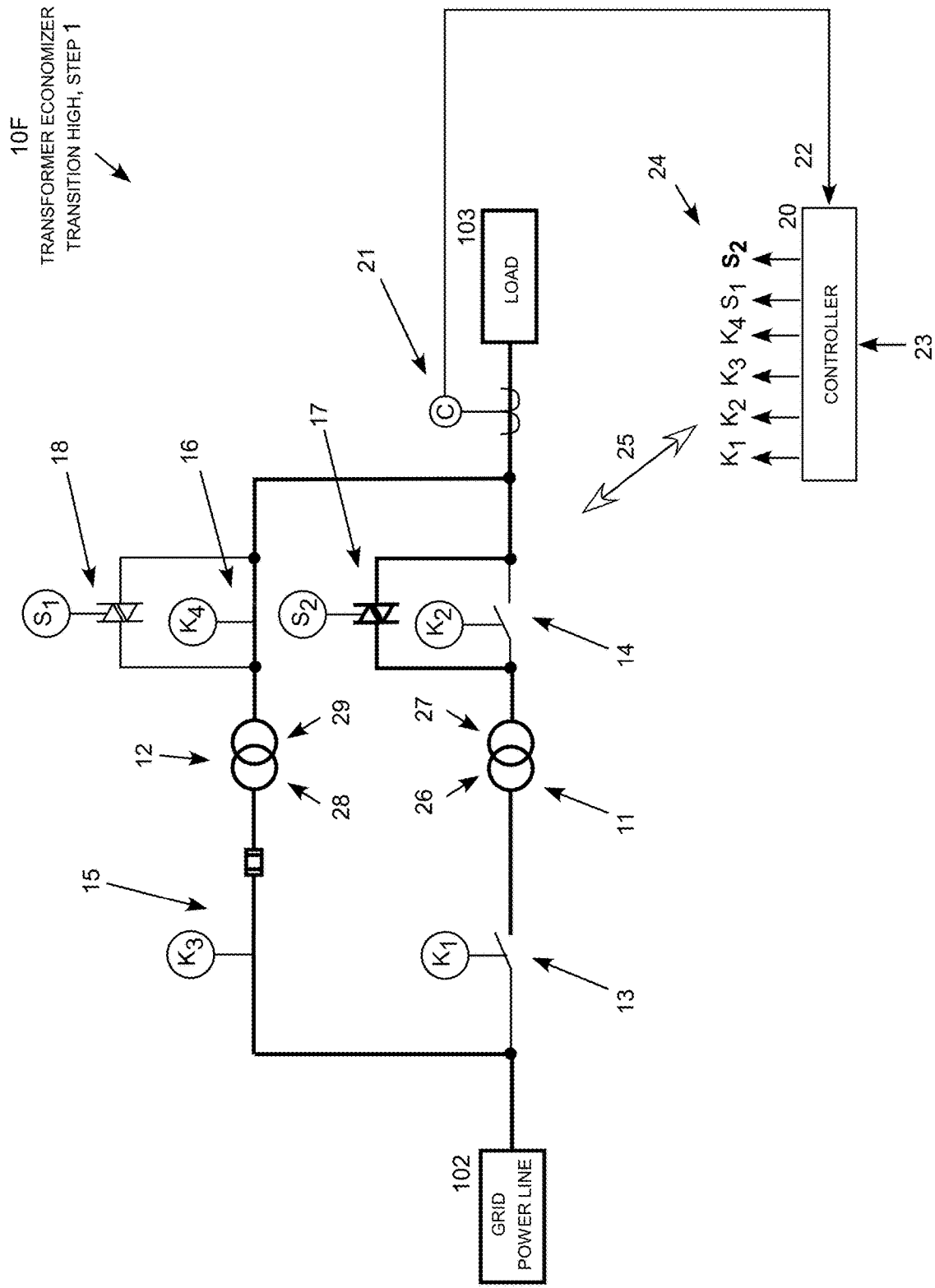
FIG. 8 is a one-line electric diagram illustrating the transformer economizer during a first step of a high transition.

The same procedure occurs in the other direction to switch the power supply back to the main transformer. Following step 35, the controller 20 detects a high transfer trigger, in this example when the power delivered to the load 103 has increased above a preset high-power threshold ("HPT") for a duration longer than the high-power dwell time. The high-power threshold and the high-power dwell time are programmable parameters entered into the controller 20, which uses these parameters and the current measurement 22 to determine when to initiate the high transition to switch the power supply the main transformer. To initiate the high-power transition, step 35 is followed by step 36 (transition high, step 1), in which the controller activates the static switch S2 to ramp the power to charge the core of the main transformer 11 by back-feeding the secondary winding 27 of the main transformer, as shown in FIG. 8.

Figure 9:
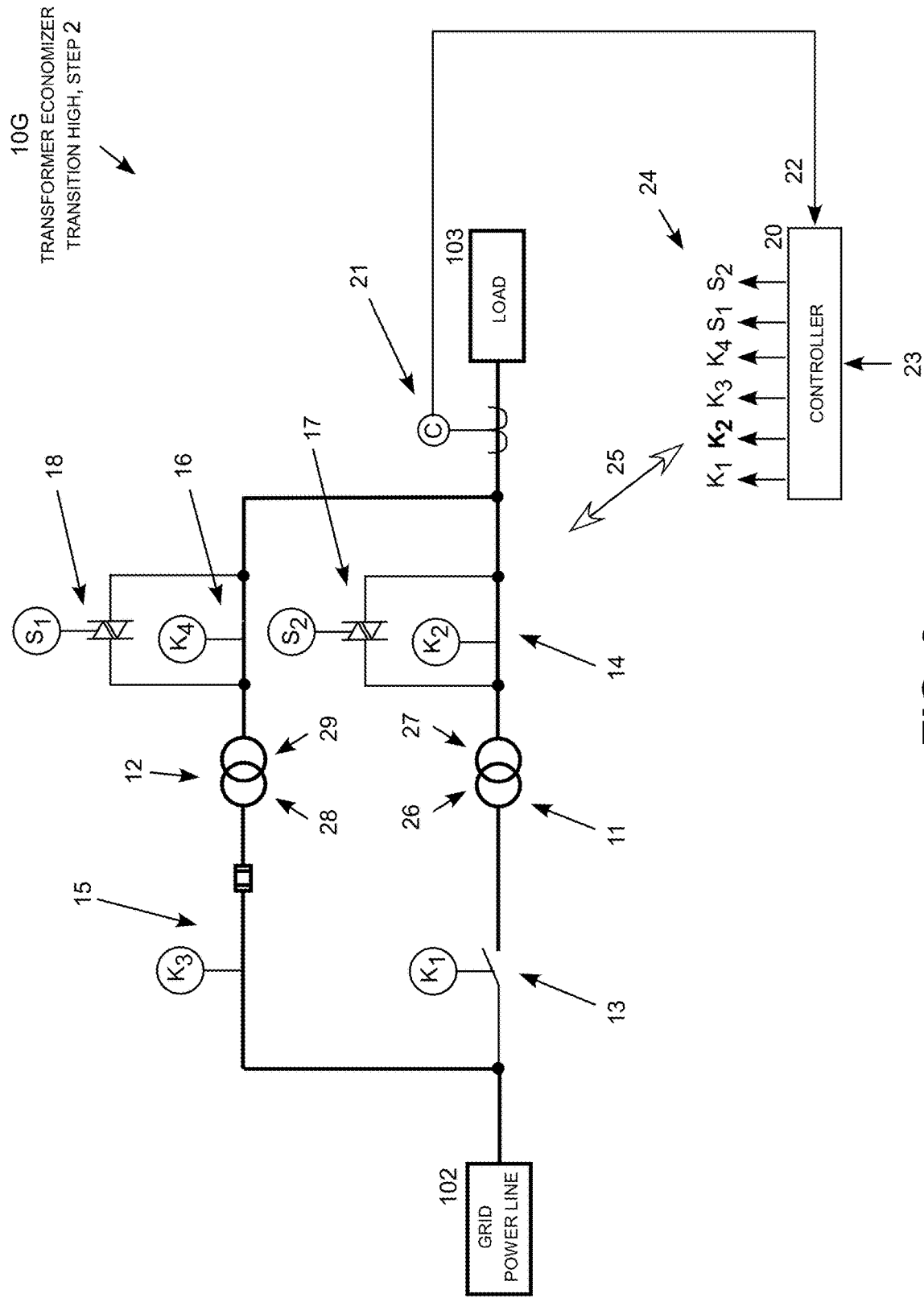
FIG. 9 is a one-line electric diagram illustrating the transformer economizer during a second step of high low transition.
Figure 10:
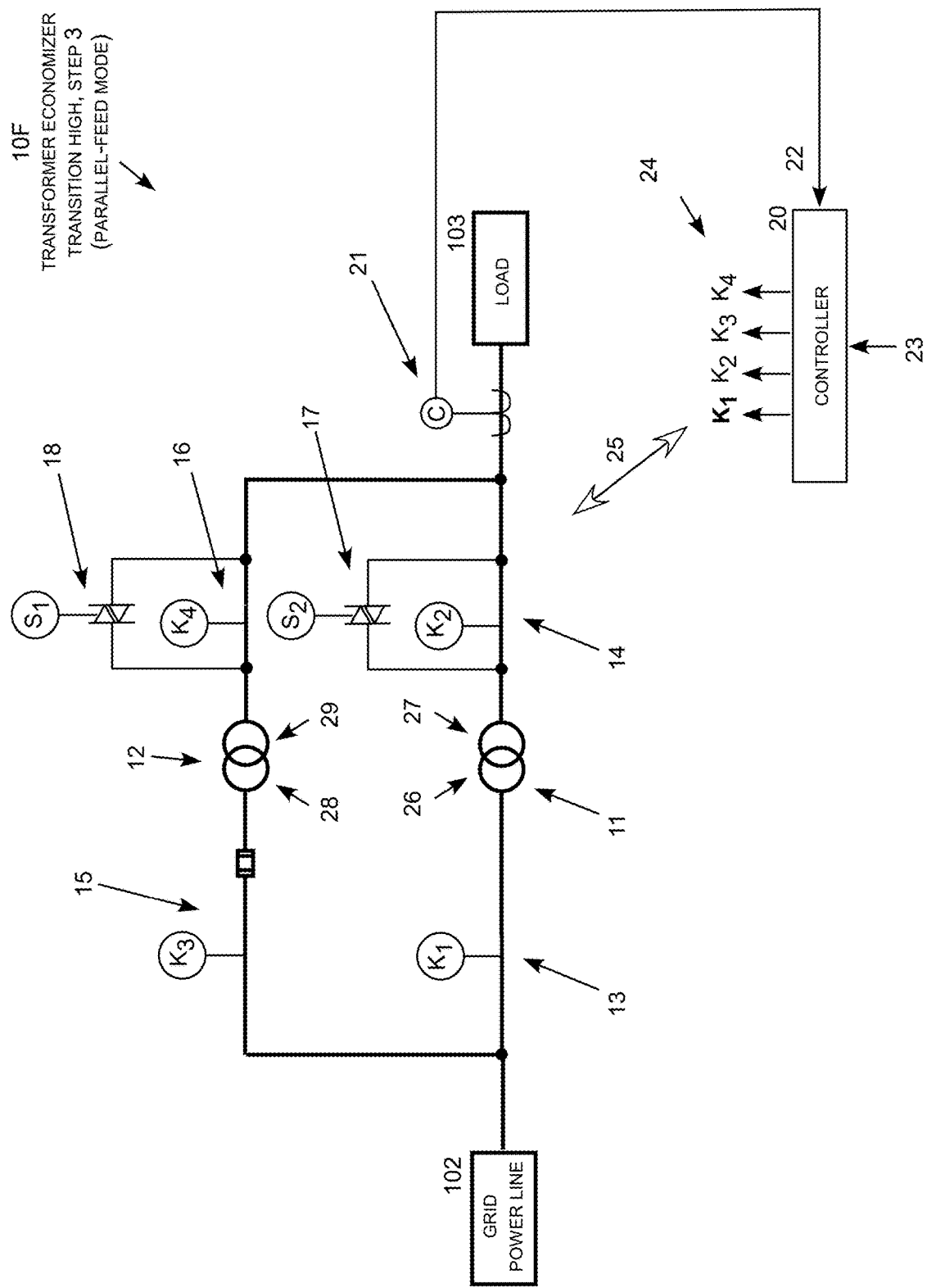
FIG. 10 is a one-line electric diagram illustrating the transformer economizer during a third step of the high transition.
Figure 11:
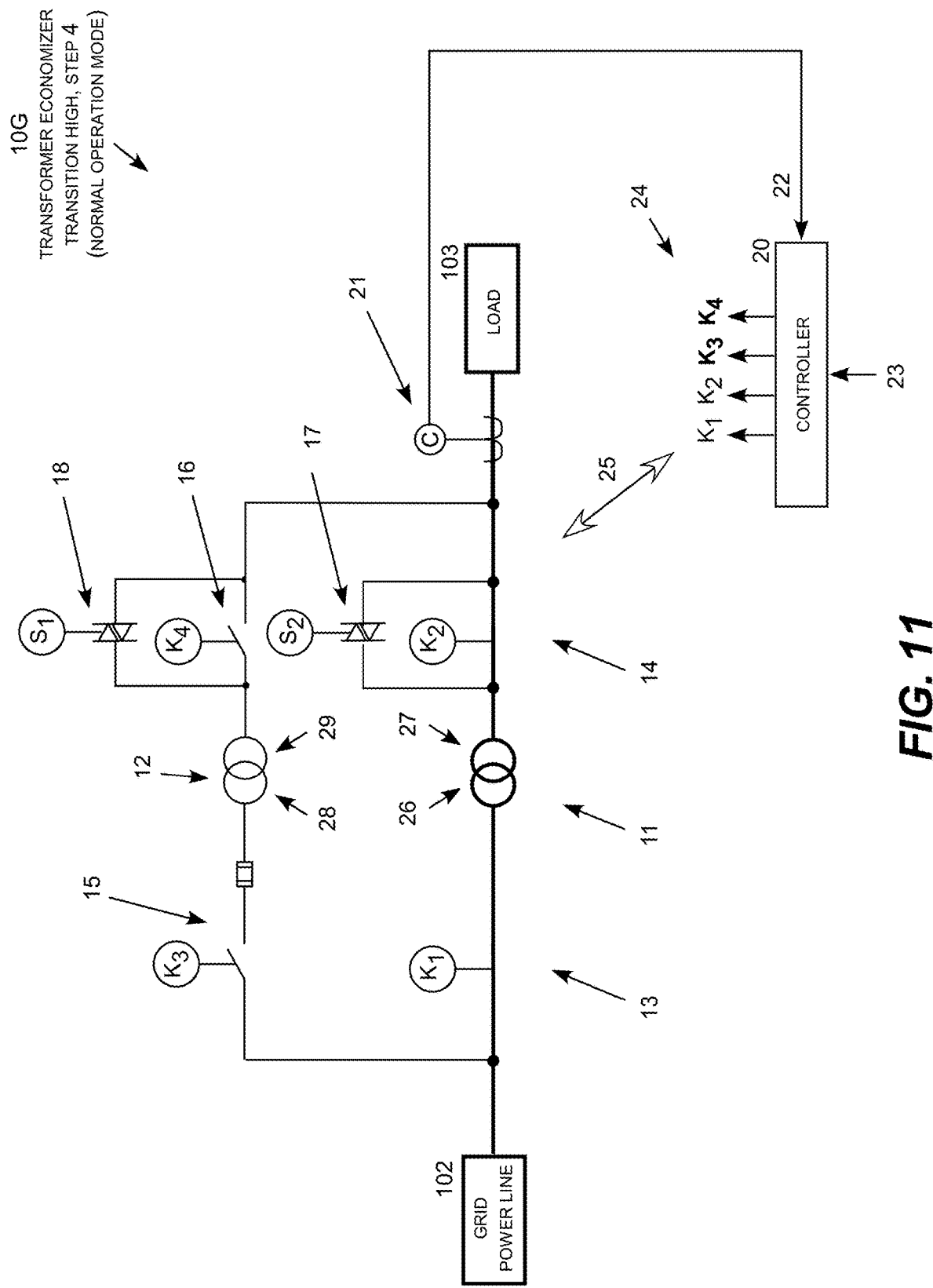
FIG. 11 is a one-line electric diagram illustrating the transformer economizer during a fourth step of the high transition.

Once the core of the main transformer 11 has been synchronized with the energized grid power line, step 36 is followed by step 37 (transition high, step 2), in which the controller activates the actuator K2 to close the main-secondary contactor 14, as shown in FIG. 9. After the main-secondary contactor 14 is closed, step 38 is followed by step 34 (transition high, step 3) in which the controller activates the actuator K1 to close the main-primary contactor 13, as shown in FIG. 10. At this point, the main transformer 11 and the auxiliary transformer 12 connect the grid power line 102 to the load 103 in parallel (parallel feed mode), which allows the auxiliary transformer to be disconnected without imposing any significant transient voltage or other switching disturbance on the grid power line 102 or the load 103. Step 38 is followed by step 39 (transition high, step 4) in which the controller activates actuators K3 to open the auxiliary-primary contactor 13 and K4 to open the auxiliary-secondary contactor 16, which disconnects the auxiliary transformer 12 from the power supply. At this point, main transformer 11 is fully connected, while the auxiliary transformer 12 is fully disconnected, between the grid power line 102 and the load 103 (normal operation mode).

Techniques similar to those discussed above can be used in variations, modifications, and adaptations to additional applications as represented by the examples in FIGS. 12-17. Those skilled in the electric power industry will understand how to modify and extend the transformer economizer technology through design choices and further adaptations.

Figure 12A:
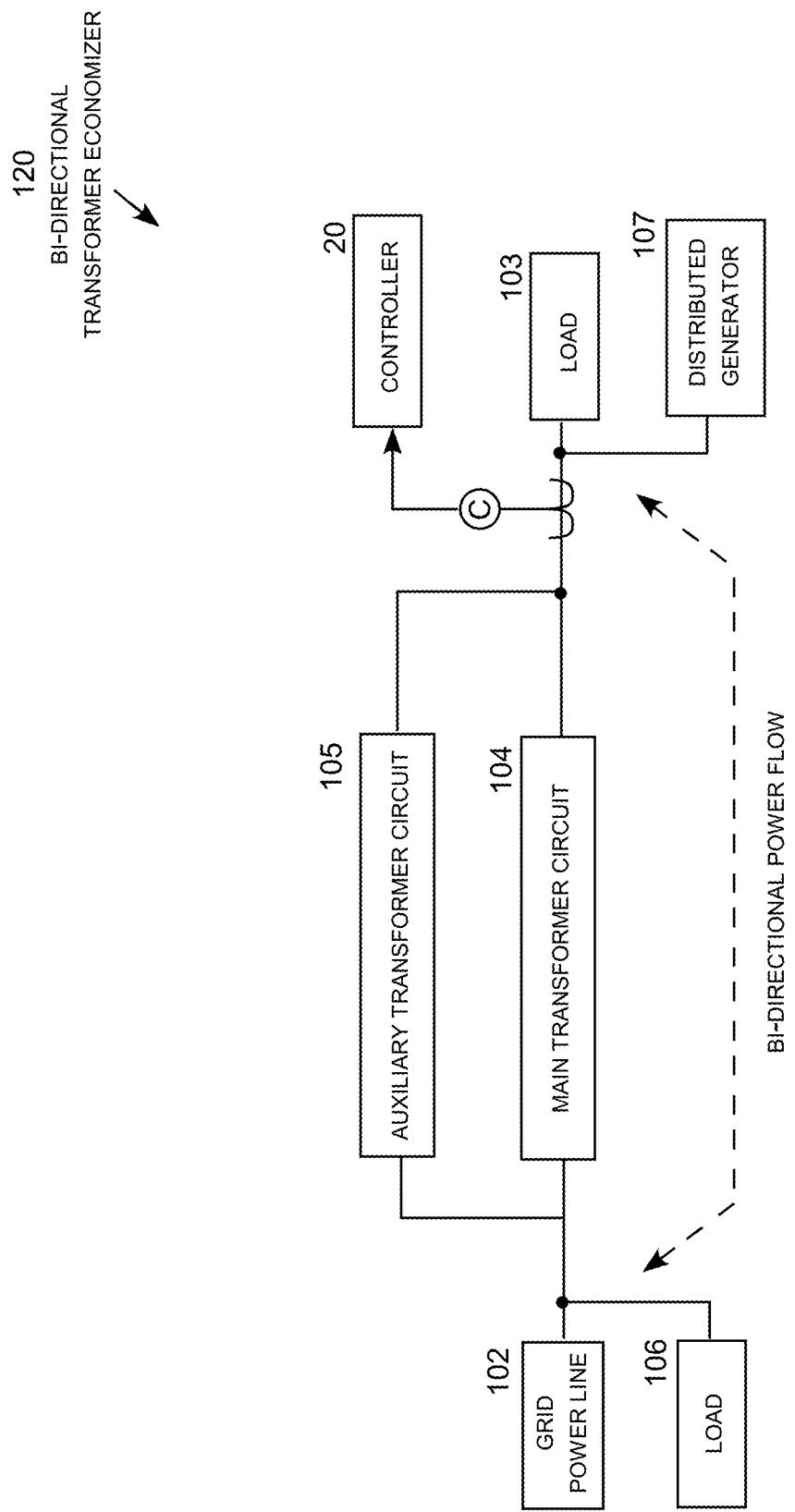
FIG. 12A is a functional block diagram of a bi-directional transformer economizer.
Figure 12B:
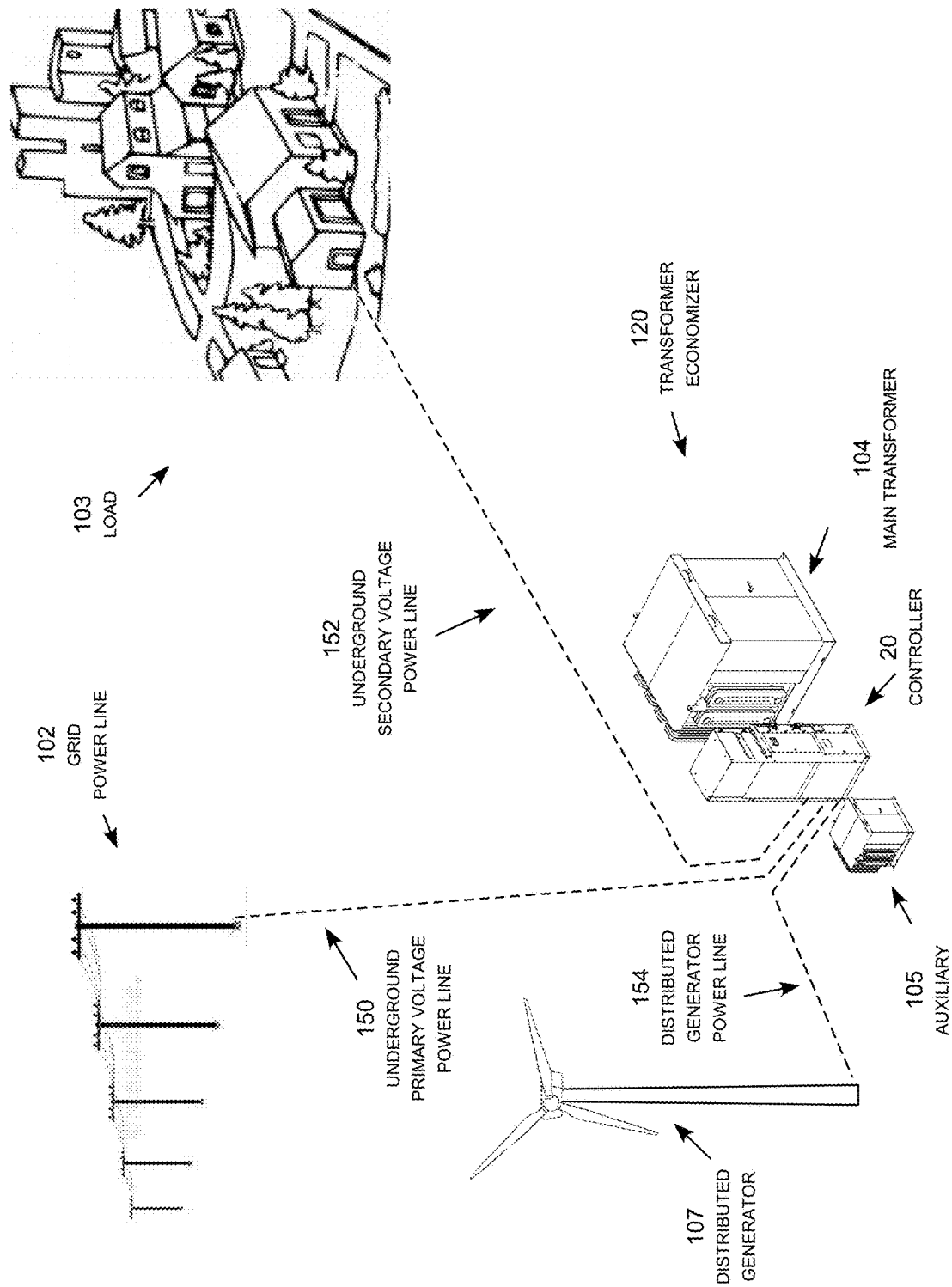
FIG. 12B is a representative physical layout of the bi-directional transformer economizer.

In a first example, FIG. 12A is a functional block diagram of a bi-directional transformer economizer 120 and FIG. 12B is physical layout of this embodiment illustrating additional underground power lines 150, 152 and 154. The transformer economizer 120 includes a load 106 on the primary side and a distributed generator 107 on the secondary side of the main and auxiliary transformer circuits 104 and 105. The same type of transformer economizer can be used for power flowing in either direction, as well as accommodate changes in the direction of the power flow. The bi-directional transformer economizer utilizes the auxiliary transformer and the main transformer to reduce low-power transformer losses in the bi-directional electric power system in which the electric power can flow in either direction between an electric grid power line connected to the primary side of the transformers and a distributed generator connected to the secondary side of the transformers. The transformer economizer switches between the man and auxiliary transformer regardless of the direction of the power flow.

Figure 13:
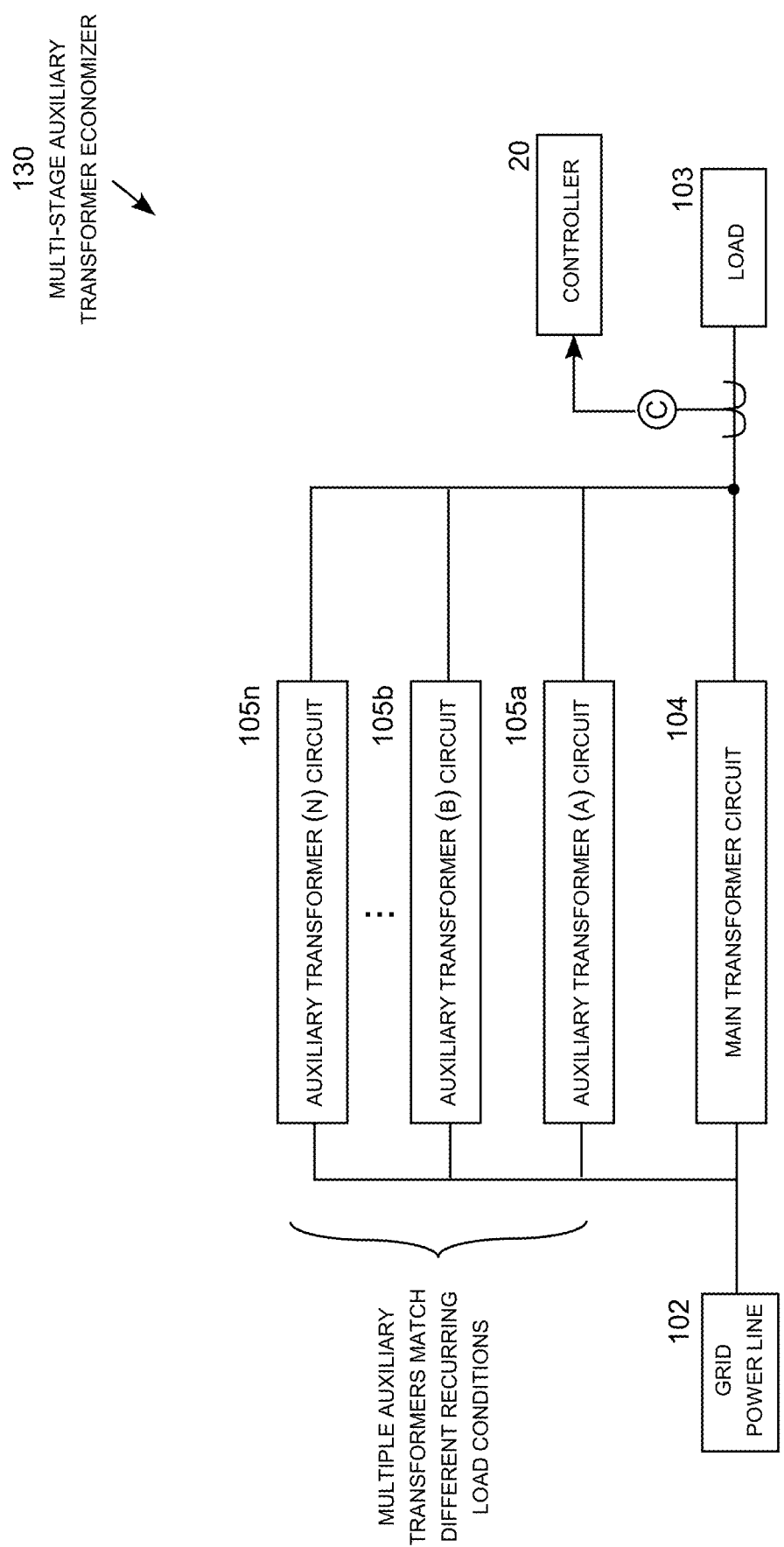
FIG. 13 is a functional block diagram of a multi-stage transformer economizer.

FIG. 13 is a functional block diagram of a multi-stage transformer economizer 130 with multiple auxiliary transformers 105a-105n. The transformer economizer uses the same switching technique to match multiple transformers to multiple recurring load levels, such as daytime peak occupancy hours and nighttime off-peak hours experienced in commercial buildings, weekday peak working hours and weekend off-peak working hours, annual or event season, industrial shift hours, industrial machines or production lines that may be in operation or offline, and so forth.

Figure 14:
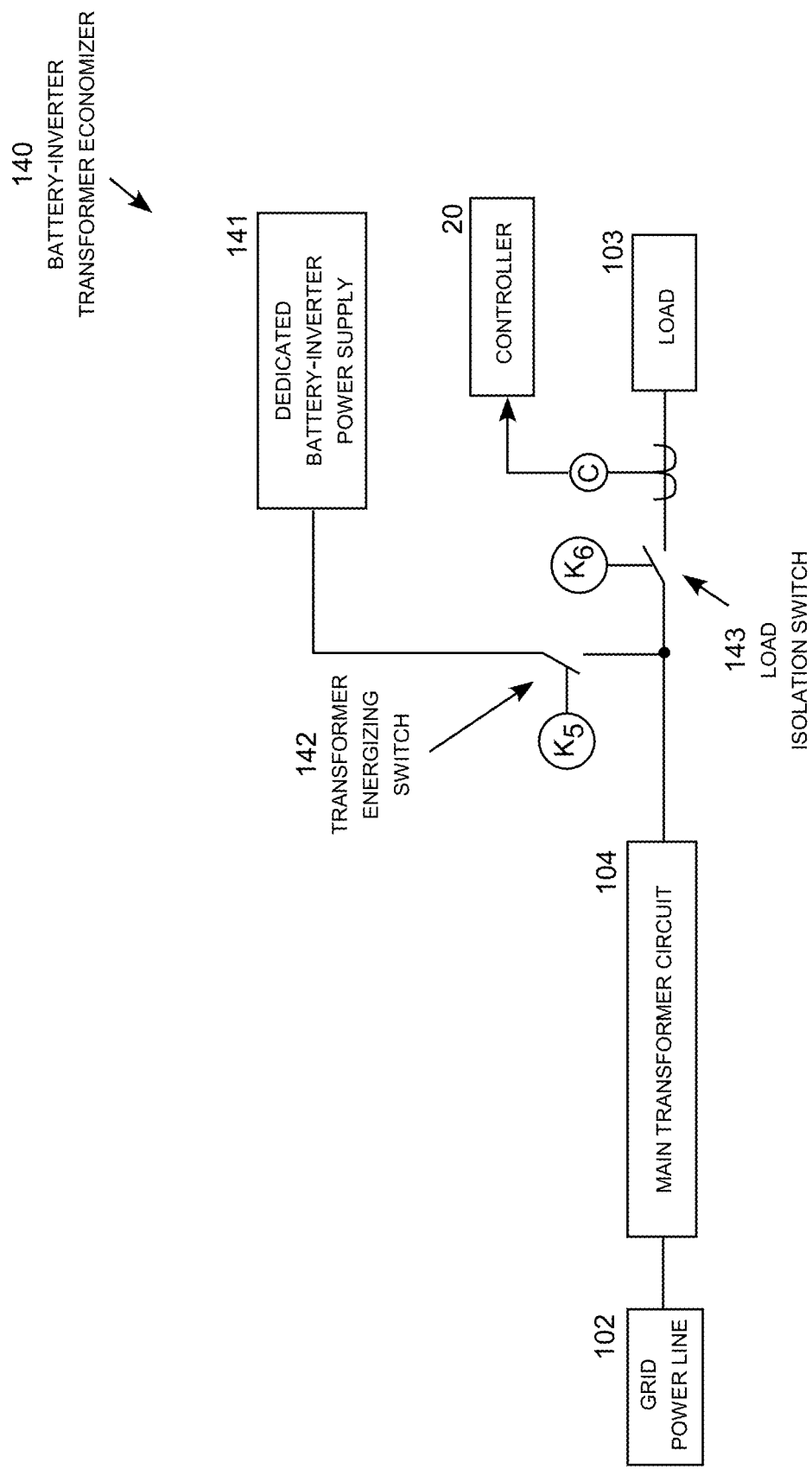
FIG. 14 is a functional block diagram of a battery-inverter transformer economizer.

FIG. 14 is a functional block diagram of a battery-inverter transformer economizer 140, in which the main transformer core is charged by a dedicated battery-inverter power supply 141 rather than an auxiliary transformer. A battery dedicated to charging the main transformer core may have a relatively small storage capacity matched to the maximum charging requirement of the main transformer core. A transformer energizing switch 142 and a load isolation switch 143 may be operated at the time of transformer charging to deliver the energy from the dedicated battery-inverter power supply 141 only to the main transformer. The main transformer circuit 104 can then be used to recharge the dedicated battery while serving the load 103 after reconnection to the grid power line 102. For example, this configuration may be a suitable for a load 103 that drops off-line completely when not in use, such as industrial equipment, water pumping or electric vehicle charging stations. Another application may be a system that has another source of auxiliary power when the main transformer 11 is disconnected, such as a tie-switch to a different grid power line, a stand-by distributed generator, or another battery for a modicum of security lighting and station power.

Figure 15:
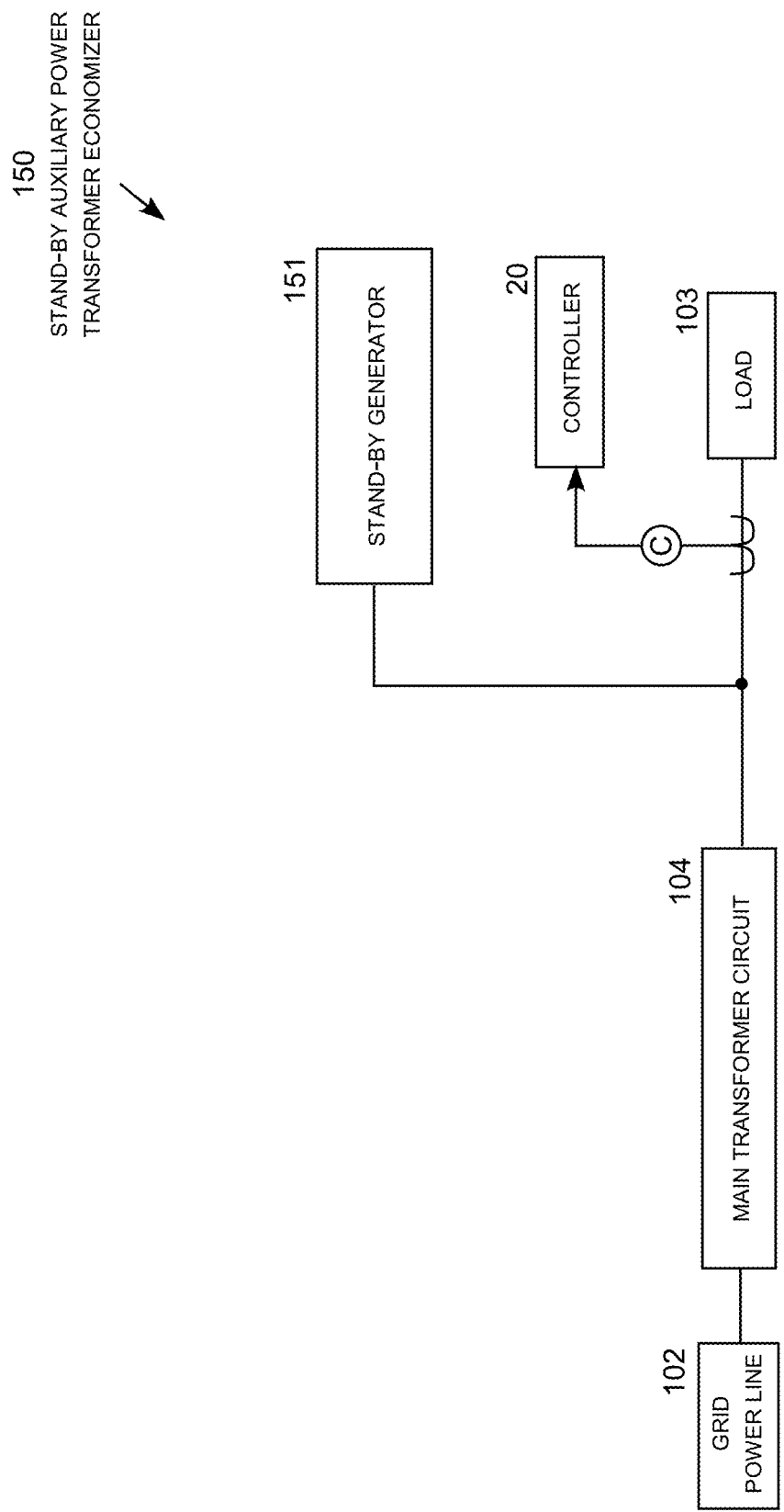
FIG. 15 is a functional block diagram of a stand-by auxiliary power transformer economizer.

FIG. 15 is a functional block diagram of a stand-by power transformer economizer 150, in which the main transformer core is charged by a stand-by generator 151 rather than an auxiliary transformer. This configuration may be a suitable for a load 103 that drops to an off-peak level served by the stand-by generator 151 when the major portion of the load is not in use. For example, the stand-by generator 151 may only power security lighting, a guard shack and a few emergency outlets when the main facility is otherwise shut down leaving the main transformer very lightly loaded.

Figure 16:
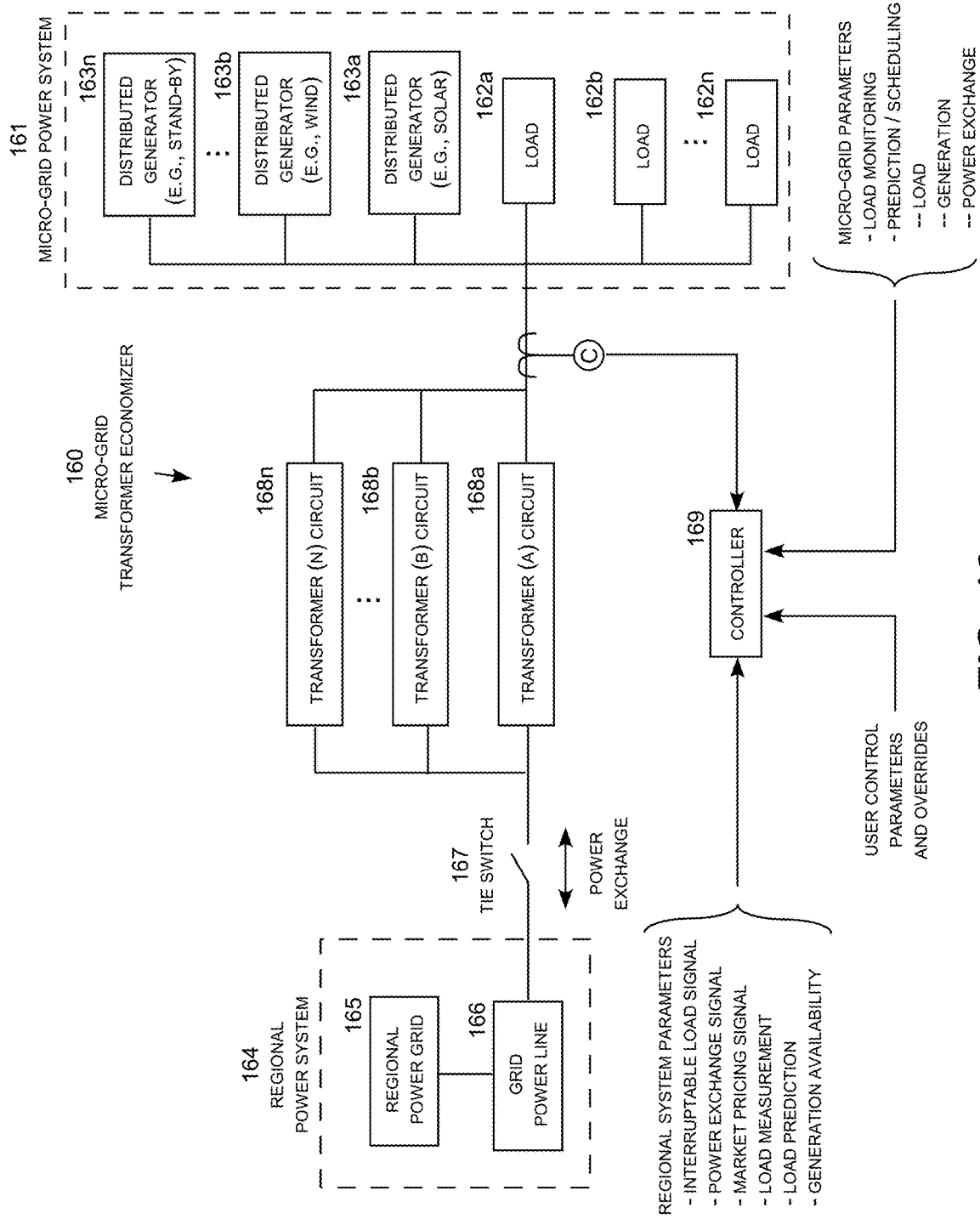
FIG. 16 is a functional block diagram of a micro-grid transformer economizer.

FIG. 16 is a functional block diagram of a micro-grid transformer economizer 160. This example includes a micro-grid power system 161 including a number of loads 162a-162n served by a number of distributed generators 163a-163n. Some of the distributed generators may be intermittent, such as a solar generator 163a and a wind generator 163b. Another generator may be a stand-by generator 163n available on demand, such as a gasoline, diesel, fuel cell, battery or similar dispatchable generator. The micro-grid power system 161 is connected to a regional power system 164 represented by the regional power grid 165 and the grid power line 166. A tie switch 167 selectively connects the micro-grid power system 161 with the grid power line 166 allowing a bi-directional power exchange between the regional power system and the micro-grid system. The power exchange allows the micro-grid power system to purchase or sell electric power with the regional power system on an as needed, as available basis. This type of arrangement may allow the micro-grid power system to take advantage of an interruptable rate schedule requiring the micro-grid to disconnect from the regional power system 164 during peak demand, load shedding events experienced by the regional power system 164. The micro-grid power system 161 may also have the ability to sell excess power generation to the regional power system 164 at predefined to marker-based rates.

The micro-grid power system 161 operates a micro-grid transformer economizer 160 including a number of available service transformer circuits 168a-168n and a controller 169 This type of power supply arrangement may provide economic incentives for the micro-grid power system 161 to reduced its load and increase its generation to increase or decrease its power exchange with the regional power system 164 based on interruptable market pricing signals, load prediction signals, and power exchange market pricing signals from the regional power system. The micro-grid power system may want to take these factors into consideration as well as its own load monitoring, load prediction, available generation, and other factors. All of the relevant and available information may therefore be provided to the controller 169, which determines or received instructions regarding the amount of transformer capacity to switch into operation based on the relevant conditions. The micro-grid transformer economizer 160 matches the connected transformer capacity to match the power exchange demand, which may flow in either direction, on an ongoing basis.

Figure 17:
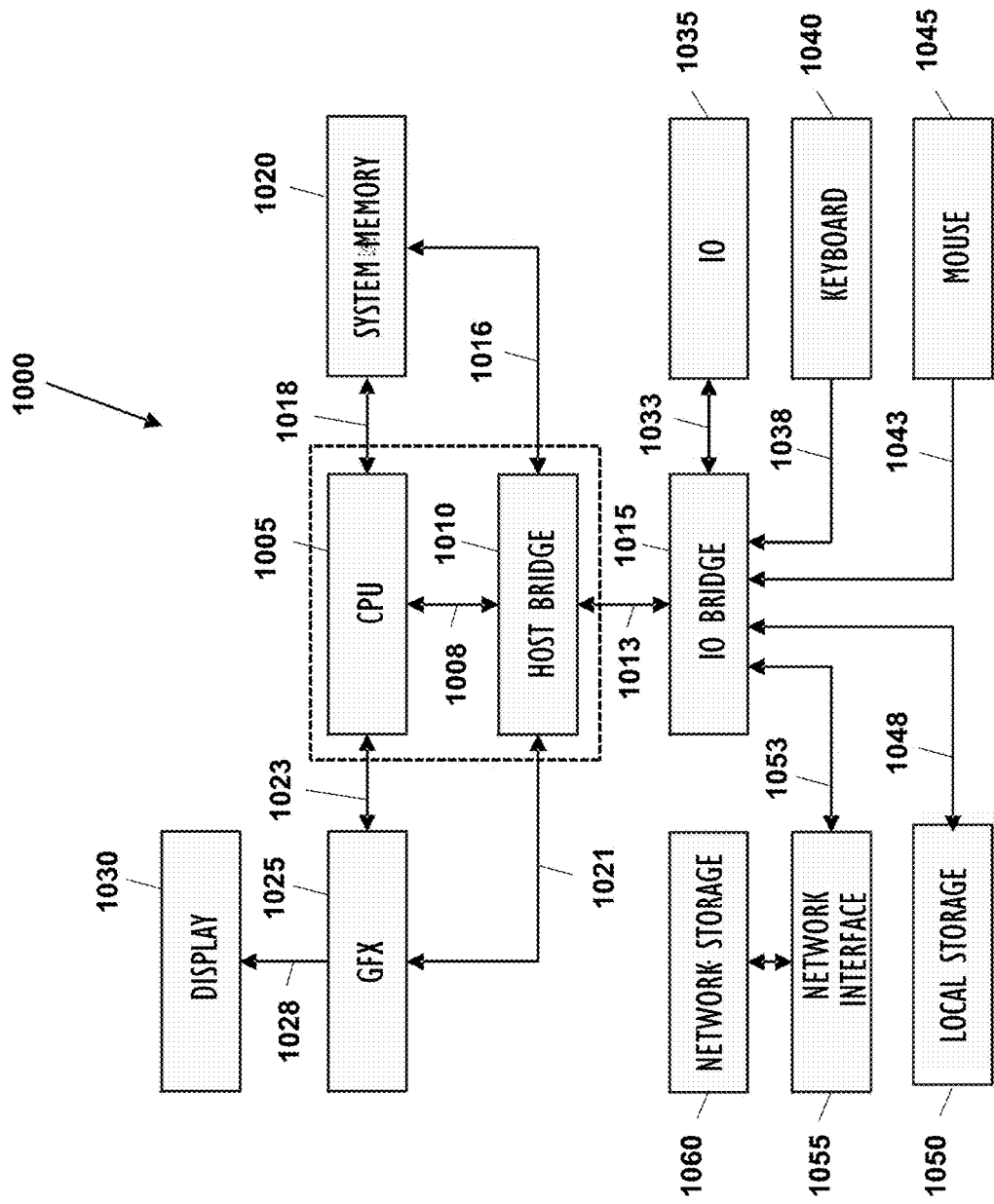
FIG. 17 is a schematic representation of a computer processing device that may be used to implement functions and processes in accordance with one or more examples of the present disclosure.

Referring now to FIG. 17, a schematic representation of a computer processing device 1000 that may be used to implement functions and processes in accordance with one or more examples of the present disclosure is shown. FIG. 17 illustrates a computer processing device 1000 that may be used to implement the systems, methods, and processes of this disclosure. For example, computer processing device 1000 illustrated in FIG. 17 could represent a client device or a physical server device and include either hardware or virtual processor(s) depending on the level of abstraction of the computing device. In some instances (without abstraction), computer processing device 1000 and its elements, as shown in FIG. 17, each relate to physical hardware. Alternatively, in some instances one, more, or all of the elements could be implemented using emulators or virtual machines as levels of abstraction. In any case, no matter how many levels of abstraction away from the physical hardware, computer processing device 1000 at its lowest level may be implemented on physical hardware. In one implementation, computer processing device 1000 may allow a subscriber to remotely access one or more data centers. Similarly, the management tool used by the subscriber may include a software solution that runs on such a computer processing device 1000.

FIG. 17 shows a computer processing device 1000 in accordance with one or more examples of the present disclosure. Computer processing device 1000 may be used to implement aspects of the present disclosure, such as aspects associated with the tuning module, the matching network, or other components of a radio frequency plasma processing device. Computer processing device 1000 may include one or more central processing units (singular "CPU" or plural "CPUs") 1005 disposed on one or more printed circuit boards (not otherwise shown). Computer processing device 1000 may further include any type of processing deice or programmable logic controller known in the ark. Computer processing device 1000 may also perform the functions of a controller, as a processor, and be used according to the methods and systems described in this disclosure. As such, computer processing device 1000 may be a controller, processor, perform the functions of the controller and/or processor, and may be used to determine capacitor positions within a matching network.

Each of the one or more CPUs 1005 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computer processing device 1000 may include one or more core logic devices such as, for example, host bridge 1010 and input/output ("IO") bridge 1015.

CPU 1005 may include an interface 1008 to host bridge 1010, an interface 1018 to system memory 1020, and an interface 1023 to one or more IO devices, such as, for example, graphics processing unit ("GFX") 1025. GFX 1025 may include one or more graphics processor cores (not independently shown) and an interface 1028 to display 1030. In certain embodiments, CPU 1005 may integrate the functionality of GFX 1025 and interface directly (not shown) with display 1030. Host bridge 1010 may include an interface 1008 to CPU 1005, an interface 1013 to IO bridge 1015, for embodiments where CPU 1005 does not include interface 1018 to system memory 1020, an interface 1016 to system memory 1020, and for embodiments where CPU 1005 does not include integrated GFX 1025 or interface 1023 to GFX 1025, an interface 1021 to GFX 1025.

One of ordinary skill in the art will recognize that CPU 1005 and host bridge 1010 may be integrated, in whole or in part, to reduce chip count, motherboard footprint, thermal design power, and power consumption. IO bridge 1015 may include an interface 1013 to host bridge 1010, one or more interfaces 1033 to one or more IO expansion devices 1035, an interface 1038 to keyboard 1040, an interface 1043 to mouse 1045, an interface 1048 to one or more local storage devices 1050, and an interface 1053 to one or more network interface devices 1055.

Each local storage device 1050 may be a solid-state memory device, a solid-state memory device array, a hard disk drive, a hard disk drive array, or any other non-transitory computer readable medium. Each network interface device 1055 may provide one or more network interfaces including, for example, Ethernet, Fibre Channel, WiMAX, Wi-Fi, Bluetooth, EtherCAT, Device Net, Mod Bus, RS-232, or any other network protocol suitable to facilitate networked communications. Computer processing device 1000 may include one or more network-attached storage devices 1060 in addition to, or instead of, one or more local storage devices 1050. Network-attached storage device 1060 may be a solid-state memory device, a solid-state memory device array, a hard disk drive, a hard disk drive array, or any other non-transitory computer readable medium. Network-attached storage device 1060 may or may not be collocated with computer processing device 1000 and may be accessible to computer processing device 1000 via one or more network interfaces provided by one or more network interface devices 1055.

One of ordinary skill in the art will recognize that computer processing device 1000 may include one or more application specific integrated circuits ("ASICs") that are configured to perform a certain function, such as, for example, hashing (not shown), in a more efficient manner. The one or more ASICs may interface directly with an interface of CPU 1005, host bridge 1010, or IO bridge 1015. Alternatively, an application-specific computing device (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 1005, host bridge 1010, IO bridge 1015, or ASICs or various sub-sets, super-sets, or combinations of functions or features thereof, may be integrated, in whole or in part, or distributed among various devices in a way that may vary based on an application, design, or form factor in accordance with one or more example embodiments. As such, the description of computer processing device 1000 is merely exemplary and not intended to limit the type, kind, or configuration of components that constitute a computing device suitable for performing computing operations, including, but not limited to, hashing functions. Additionally, one of ordinary skill in the art will recognize that computing device 1700, an application specific computing device (not shown), or combination thereof, may be disposed in a standalone, desktop, server, or rack mountable form factor.

One of ordinary skill in the art will recognize that computing device 1700 may be a cloud-based server, a server, a workstation, a desktop, a laptop, a netbook, a tablet, a smartphone, a mobile device, and/or any other type of computing device in accordance with one or more example embodiments.

The controllers described above are computing devices that store and execute non-transient computer-executable instructions to perform the control functions described in this disclosure. Each computing devices in the various transformer economizer embodiments generally include general or special purpose computer components including user input/output ("I/O") devices, wired and wireless communication hardware and software, local area and wide area network connection hardware and software, one or more processors, one or more computer readable storage media storing non-transitory computer-executable instructions that, when executed by the processor, causes the controller to perform operations described in the flow charts and elsewhere in this disclosure. The processor may be, for example, a central processing unit ("CPU"), sometimes referred to as a controller, microcontroller, processor or similar designation, together with other motherboard, computer bus, random access memory, solid state or other non-volatile memory, peripheral device drivers, and interface components typically included in general purpose, specially programmed user devices, network devices, and computing platforms. For example, each controller described as part of the various transformer economizer embodiments may be a computing device commonly referred to as an erasable programmable read only memory ("EEPROM"), a programmable logic controller ("PLC"), a field programmable gate array ("FPGA"), an application-specific integrated circuit ("ASIC"), a microcontroller, a relay controller, a general purpose computer, a cloud computer platform, or any other suitable computing device as deemed appropriate or convenient for the computing task at hand.

The executable instructions are stored in the controller as may be the programmable parameters on some kind of machine-readable storage medium. A machine-readable storage medium may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities).

A typical data processing system may be implemented utilizing any suitable commercially available components, such as those typically found in data computing and/or communication and/or network computing/communication systems. All of the technology described in this disclosure is suitable for implementation using commercially available computing devices, such as network servers and smartphones or personal computers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected," or "coupled," to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

It will be appreciated that layers, features, elements, etc., depicted herein are illustrated with particular dimensions relative to one another, such as structural dimensions or orientations, for example, for purposes of simplicity and ease of understanding and that actual dimensions of the same differ substantially from that illustrated herein, in some embodiments. Moreover, "exemplary" is used herein to mean serving as an example, instance, illustration, etc., and not necessarily as advantageous. As used in this application, "or" is intended to mean an inclusive "or" rather than an exclusive "or." In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes," "having," "has," "with," or variants thereof are used, such terms are intended to be inclusive in a manner similar to the term "comprising." Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

The invention claimed is:

1. An electric power transformer economizer, comprising:
a main transformer circuit comprising a main transformer comprising a primary winding coupled to a secondary winding through a magnetic core the primary winding of the main transformer circuit electrically connected to a grid power line and the secondary winding of the main transformer connected to a load;
an auxiliary transformer circuit comprising an auxiliary transformer comprising a primary winding coupled to a secondary winding through a magnetic core, the primary winding of the auxiliary transformer electrically connected to the grid power line and the secondary winding of the auxiliary winding connected to the load;
a sensor providing an electric current measurement associated with power delivered to the load;
a main-primary contactor coupled to the grid power line and the primary winding of the main transformer;
a main-secondary contactor coupled to the secondary winding of the main transformer and the load; and
a first static switch electrically connected in parallel with the main-secondary contactor;
an auxiliary-primary contactor coupled to the grid power line and the primary winding of the auxiliary transformer;
an auxiliary-secondary contactor coupled to the secondary winding of the auxiliary transformer and the load;
a second static switch electrically connected in parallel with the auxiliary secondary contactor; and
a controller that, in operation, performs a method comprising:
receiving the electric current measurement and a plurality of control parameters;
determining a low transition trigger based on the electric current measurement and the control parameters;
in response to the low transition trigger, automatically ramping electric current to the secondary winding of auxiliary transformer through a first static switch to energize the secondary winding and the magnetic core of the auxiliary transformer, and then connecting the auxiliary transformer to the grid power line and the load and disconnecting the main transformer from the grid power line and the load; and
determining a high transition trigger and, in response to the high transition trigger, automatically ramping electric current to the secondary winding of main transformer through a second static switch to energize the secondary winding and the magnetic core of the main transformer, and then connecting the main transformer to the grid power line and the load and disconnecting the auxiliary transformer from the grid power line and the load.

2. The transformer economizer of claim 1, wherein:
the control parameters comprise a programmable low-power threshold and a programmable low-power dwell time; and
determining the low transition trigger comprises determining that the power delivered to the load has been equal to or below the low-power threshold for a period of time equal to or greater than the low-power dwell time.

3. The transformer economizer of claim 1, wherein:
the control parameters comprise a programmable high-power threshold and a programmable high-power dwell time; and
determining the high transition trigger comprises determining that the power delivered to the load has been equal to or greater than the high-power threshold for a period of time equal to or greater than the high-power dwell time.

4. The transformer economizer of claim 1, wherein:
the auxiliary transformer has a rated auxiliary power capacity;
the control parameters include load scheduling parameters; and
determining the high transition trigger comprises determining the load is scheduled to be above rated auxiliary power capacity based on the load scheduling parameters.

5. The transformer economizer of claim 4, wherein the load scheduling parameters comprise one or more of an industrial shift schedule, and industrial equipment schedule, an arena event schedule, an electric transportation schedule, a water pumping schedule, and an electric vehicle charging station schedule.

6. The transformer economizer of claim 1, wherein:
the auxiliary transformer has a rated auxiliary power capacity;
the control parameters include load predicting parameters; and
determining the high transition trigger comprises determining that the load is predicted to be above rated auxiliary power capacity based on the load predicting parameters.

7. The transformer economizer of claim 6, wherein the load predicting parameters comprise one or more of a time-of-day, a day-of-week, a holiday, an annual or event season, a travel forecast, a weather forecast, and a solar index prediction.

8. The transformer economizer of claim 1, wherein one or more of the low and high transition triggers are based on one or more load-side power generation parameters.

9. The transformer economizer of claim 1, wherein: the main transformer circuit further comprises:
and
connecting the auxiliary transformer to the grid power line and the load, and disconnecting the main transformer from the grid power line and the load, further comprises:
switching the first static switch to ramp a magnetizing current energizing a magnetic core of the auxiliary transformer through the secondary winding of the auxiliary transformer in a controlled manner;
after energizing the magnetic core of the auxiliary transformer, closing the auxiliary-secondary contact or;
after closing the auxiliary-secondary contactor, closing the auxiliary-primary contactor momentarily connecting the auxiliary transformer and the main transformer in parallel between the grid power line and the load; and
after closing the auxiliary-primary contactor, opening the main-primary and main secondary contactors.

10. The transformer economizer of claim 9, wherein:
connecting the main transformer to the grid power line and the load, and disconnecting the auxiliary transformer from the grid power line and the load, further comprises:
- switching the second static switch to ramp a magnetizing current energizing a magnetic core of the main transformer through the secondary winding of the main transformer in a controlled manner;
- after energizing the magnetic core of the main transformer, closing the main-secondary contactor;
- after closing the main-secondary contactor, closing the main-primary contactor momentarily connecting the main transformer and the auxiliary transformer in parallel between the grid power line and the load; and
- after closing the main-primary contactor, opening the auxiliary-primary and main-secondary contactors.

11. An electric power transformer economizer, comprising:
- a main transformer circuit comprising a main transformer comprising a primary winding coupled to a secondary winding through a magnetic core, the primary winding of the main transformer circuit electrically connected to a grid power line and the secondary winding of the main transformer connected to a load;
- an auxiliary transformer circuit comprising an auxiliary transformer comprising a primary winding coupled to a secondary winding through a magnetic core, the primary winding of the auxiliary transformer electrically connected to the grid power line and the secondary winding of the auxiliary winding connected to the load;
- a sensor providing an electric current measurement associated with power delivered to the load;
- a main-primary contactor coupled to the grid power line and the primary winding of the main transformer;
- a main-secondary contactor coupled to the secondary winding of the main transformer and the load;
- a second static switch electrically connected in parallel with the main-secondary contactor;
- an auxiliary-primary contactor coupled to the grid power line and the primary winding of the auxiliary transformer;
- an auxiliary-secondary contactor coupled to the secondary winding of the auxiliary transformer and the load;
- a first static switch electrically connected in parallel with the auxiliary-secondary contactor;
- a controller that performs a method comprising:
- receiving the electric current measurement and a plurality of control parameters;
- based on the electric current measurement and control parameters, determining a low transition trigger;
- in response to the low transition trigger, automatically switching a first static switch to ramp electric current to the secondary winding of auxiliary transformer through a first static switch to energize the secondary winding and the magnetic core of the auxiliary transformer, and then connecting the auxiliary transformer to the grid power line and the load, and disconnecting the main transformer from the grid power line and the load;
- based on the electric current measurement and the control parameters, determining a high transition trigger; and
- in response to the high transition trigger, automatically switching a second static switch to ramp electric current to the secondary winding of main transformer through a second static switch to energize the secondary winding and the magnetic core of the main transformer, and then connecting the main transformer to the grid power line and the load, and disconnecting the auxiliary transformer from the grid power line and the load.

12. The transformer economizer of claim 11, wherein: the main transformer circuit further comprises:
connecting the main transformer to the grid power line and the load, and disconnecting the auxiliary transformer from the grid power line and the load, further comprises:
- switching the second static switch to ramp a magnetizing current energizing a magnetic core of the main transformer through the secondary winding of the main transformer in a controlled manner;
- after energizing the magnetic core of the main transformer, closing the main secondary contactor;
- after closing the main-secondary contactor, closing the main-primary contactor momentarily connecting the main transformer and the auxiliary transformer in parallel between the grid power line and the load; and
- after closing the main-primary contactor, opening the auxiliary-primary and main secondary contactors.

13. The transformer economizer of claim 11, wherein connecting the auxiliary transformer to the grid power line and the load and disconnecting the main transformer from the grid power line and the load, further comprises:
- switching the first static switch to ramp a magnetizing current energizing a magnetic core of the auxiliary transformer through the secondary winding of the auxiliary transformer in a controlled manner;
- after energizing the magnetic core of the auxiliary transformer, closing the auxiliary-secondary contactor;
- after closing the auxiliary-secondary contactor, closing the auxiliary-primary contactor momentarily connecting the auxiliary transformer and the main transformer in parallel between the grid power line and the load; and
- after closing the auxiliary-primary contactor, opening the main-primary and main-secondary contactors.

14. The transformer economizer of claim 11, wherein:
- the control parameters comprise a programmable low-power threshold and a programmable low-power dwell time; and
- determining the low transition trigger comprises determining that the power delivered to the load has been equal to or below the low-power threshold for a period of time equal to or greater than the low-power dwell time.

15. The transformer economizer of claim 11, wherein:
- the auxiliary transformer has a rated auxiliary power capacity;
- the control parameters include load scheduling parameters; and
- determining the high transition trigger comprises determining the load is scheduled to be above rated auxiliary power capacity based on the load scheduling parameters.

16. The transformer economizer of claim 11, wherein:
- the auxiliary transformer has a rated auxiliary power capacity;
- the control parameters include load predicting parameters; and
- determining the high transition trigger comprises determining that the load is predicted to be above rated auxiliary power capacity based on the load predicting parameters.

* * * * *